United States Patent
Huang et al.

(10) Patent No.: US 11,206,618 B2
(45) Date of Patent: Dec. 21, 2021

(54) UPLINK POWER CONTROL METHOD, TERMINAL AND NETWORK DEVICE

(71) Applicant: DATANG MOBILE COMMUNICATIONS EQUIPMENT CO., LTD., Beijing (CN)

(72) Inventors: Qiuping Huang, Beijing (CN); Qiubin Gao, Beijing (CN); Rakesh Tamrakar, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/054,453

(22) PCT Filed: May 8, 2019

(86) PCT No.: PCT/CN2019/086015
§ 371 (c)(1),
(2) Date: May 28, 2021

(87) PCT Pub. No.: WO2019/214648
PCT Pub. Date: Nov. 14, 2019

(65) Prior Publication Data
US 2021/0314873 A1    Oct. 7, 2021

(30) Foreign Application Priority Data
May 8, 2019   (CN) .............................. 201810450703

(51) Int. Cl.
*H04W 52/14* (2009.01)
*H04B 7/0456* (2017.01)
(Continued)

(52) U.S. Cl.
CPC ........ *H04W 52/146* (2013.01); *H04B 7/0456* (2013.01); *H04L 5/0051* (2013.01); *H04L 25/0226* (2013.01); *H04W 8/24* (2013.01)

(58) Field of Classification Search
CPC .................... G06F 9/44; H04B 7/0456; H04B 7/046–0486; H04L 5/0048; H04L 5/0051;
(Continued)

(56) References Cited

U.S. PATENT DOCUMENTS

| | | | |
|---|---|---|---|
| 10,644,855 B2 * | 5/2020 | Lee | H04W 72/0473 |
| 10,945,218 B2 * | 3/2021 | Chen | H04W 52/146 |

(Continued)

FOREIGN PATENT DOCUMENTS

| | | |
|---|---|---|
| CN | 101674642 A | 3/2010 |
| CN | 102077657 A | 5/2011 |

(Continued)

OTHER PUBLICATIONS

3GPP TSG RAN WG1 Meeting #91 R1-1719737. "Discussion on codebook based UL transmission" No. 7.2.1.2. Nov. 2017, entire document.

(Continued)

*Primary Examiner* — Thomas R Cairns
(74) *Attorney, Agent, or Firm* — Ladas & Parry, LLP

(57) ABSTRACT

An uplink power control method, a terminal, and a network device are provided, which relates to the field of communications, and is to solve a problem that the terminal cannot reach a maximum transmission power for codebook-based or non-codebook-based uplink multi-antenna transmission in related technologies. The method includes: obtaining an uplink precoding indication; and controlling a value of an uplink transmission power determined according to a power control procedure to remain unchanged, in a case that the uplink precoding indication corresponds to a target precod- (Continued)

ing indication. Based on the solution of the present disclosure, it is ensured that the maximum uplink transmission power can be reached under part of precoding indications, the coverage of uplink transmission can be improved, and it is not required that all antennas of the terminal can reach the maximum transmission power, thereby reducing the cost.

18 Claims, 2 Drawing Sheets

(51) Int. Cl.
*H04W 8/24* (2009.01)
*H04L 5/00* (2006.01)
*H04L 25/02* (2006.01)

(58) Field of Classification Search
CPC . H04L 25/0226; H04M 1/72406; H04W 8/24; H04W 8/245; H04W 52/02; H04W 52/146; H04W 60/06
See application file for complete search history.

(56) References Cited

U.S. PATENT DOCUMENTS

| | | | |
|---|---|---|---|
| 2008/0080634 A1 | 4/2008 | Kotecha et al. | |
| 2013/0128833 A1 | 5/2013 | Lee et al. | |
| 2014/0029522 A1 | 1/2014 | Farmanbar et al. | |
| 2014/0140313 A1 | 5/2014 | Liu et al. | |
| 2016/0234788 A1 | 8/2016 | Noh et al. | |
| 2019/0372732 A1* | 12/2019 | Faxer | H04L 5/0048 |
| 2020/0374868 A1* | 11/2020 | Liang | H04L 5/0057 |

FOREIGN PATENT DOCUMENTS

| | | | |
|---|---|---|---|
| CN | 102387575 A | 3/2012 | |
| CN | 103096448 A | 5/2013 | |
| CN | 103379603 A | 10/2013 | |
| CN | 105594263 A | 5/2016 | |
| CN | 105897377 A | 8/2016 | |
| EP | 2244390 A2 | 10/2010 | |
| JP | 2016187187 A | 10/2016 | |
| WO | 2009026741 A1 | 3/2009 | |
| WO | 2011053220 A1 | 5/2011 | |
| WO | 2013149440 A1 | 10/2013 | |
| WO | WO-2019193426 A1 * | 10/2019 | ........... H04B 7/0426 |

OTHER PUBLICATIONS

International Search Report in the international application No. PCT/CN2019/086015, dated Jul. 30, 2019.
Written Opinion of the International Searching Authority in international application No. PCT/CN2019/086015, dated Jul. 30, 2019.
3GPP TSG RAN WG1 Meeting #92bis R1-1804056. "Remaining issues in non-codebook based transmission for UL" No. 7.1.2.1.3. Feb. 2018, entire document.
3GPP TSG RAN WG1 Meeting #92bis R1-1805205. "Power control for UL MIMO" No. 7.1.6.3. Apr. 2018, entire document.
First Office Action in Chinese application No. 201810450703.2, dated Apr. 27, 2020.
International Preliminary Report on Patentability issued for international application No. PCT/CN2019/086015 dated Nov. 17, 2020.
"Design Principles for UC on PUSCH", Rl-102631, TSG-RAN WG1 #61, Montreal, Canada, May 10-14, 2010.
"Codebook based transmission for UL MIMO", Rl-1710447, 3GPP TSG RAN WG1 NR Ad Hoc Meeting, Qingdao, China, Jun. 27-30, 2017.
Notification of Reason for Refusal from KR app. No. 10-2020-7035292, dated lune 21, 2021, with English translation from Global Dossier.
Partial Supplementary European Search Report from EP app. No. 19800613.2, dated May 21, 2021.

* cited by examiner

UPLINK POWER CONTROL METHOD, TERMINAL AND NETWORK DEVICE

CROSS-REFERENCE TO RELATED APPLICATIONS

This application is the U.S. national phase of PCT Application No. PCT/CN2019/086015 filed on May 8, 2019, which claims a priority to Chinese Patent Application No. 201810450703.2 filed on May 11, 2018, the disclosures of which are incorporated in their entireties by reference herein.

TECHNICAL FIELD

The present disclosure relates to the field of communications, in particular to an uplink power control method, a terminal and a network device.

BACKGROUND

In some communication systems, a terminal may calculate an uplink transmission power according to a power control procedure (power control for short), and then scale the uplink transmission power according to a certain power control method before using it for uplink transmission. For example, in Long Term Evolution (LTE) systems, an uplink power control method is specified, and a terminal may calculate a transmission power $\hat{P}_{PUSCH,c}(i)$ of a physical uplink shared channel (Physical Uplink Shared Channel, PUSCH) in accordance with an uplink power control procedure defined in subclause 5.1.1 in 3GPP protocol TS36.213 (3GPP TS 36.213: "Evolved Universal Terrestrial Radio Access (E-UTRA); Physical layer procedures (physical layer procedures)"), and then may scale the transmission power according to a ratio of the number of antennas ports on which a non-zero PUSCH is transmitted to the number of antenna ports configured by a base station for a transmission scheme corresponding to the PUSCH, when the PUSCH is transmitted. In actual uplink transmission, the resulting scaled power is split equally across the antenna ports on which the non-zero PUSCH is transmitted. $\hat{P}_{PUSCH,c}(i)$ is determined by the terminal, according to the specification of the power control procedure, from information such as power control indication information from a base station, path fading information estimated by a terminal, and a maximum uplink output power. The advantage of scaling the uplink transmission power ($\hat{P}_{PUSCH,c}(i)$ in this example) determined according to the power control procedure by a ratio of the antenna ports is that it does not require all antennas of the terminal to reach a maximum output power, which can reduce the implementation cost of the terminal.

In consideration of the cost, not all terminals that support multiple antennas have a good transmission antenna calibration capability. Accordingly, different terminals may have different coherent transmission capabilities. For example, for some terminals, all antennas can perform coherent transmission, some other terminals only have part of antennas that can perform coherent transmission, and for some other terminals, no antenna can perform coherent transmission.

Three types of coherent transmission capabilities of terminals are defined in 3GPP NR systems:

full coherent: for a terminal with antenna full coherent transmission capability, all antennas can perform coherent transmission, that is, all antennas can perform phase calibration;

partial coherent: for a terminal with antenna partial coherent transmission capability, only paired antennas can perform coherent transmission, that is, the paired transmission antennas of the terminal can perform calibration; and non-coherent: for a terminal with antenna non-coherent transmission capability, no antenna can be used for coherent transmission, that is, all transmission antennas of the terminal cannot be calibrated.

In codebook-based uplink transmissions, terminals with different coherent transmission capabilities correspond to different codewords in a codebook. If the terminal is still required to scale an uplink transmission power that is determined according to a power control procedure, in accordance with a proportion of non-zero PUSCH transmission ports in the total configured ports, it may cause a terminal with non-coherent transmission capability and a terminal with partial coherent transmission capability to fail to reach a maximum transmission power when in a low rank (rank) such as rank1.

For non-codebook-based uplink transmissions, it may directly cause a terminal to fail to reach a maximum transmission power when the rank number is less than the number of configured uplink sounding reference signal (Sounding Reference Signal, SRS) resources.

When a signal-to-noise ratio (Signal Noise Ratio, SNR) of a terminal is relatively low (especially the terminal at an edge of a cell), transmission is usually performed at a low rank and a maximum transmission power to improve performance. According to a current uplink power scaling criteria by a proportion of antenna ports, when a terminal with non-codebook-based uplink transmission or a terminal with a non-coherent transmission capability and codebook-based uplink transmission is configured with N antenna ports, the transmission power of a single-rank transmission can only be 1/N of the maximum transmission power. If the transmission power during the single-rank transmission can be increased to the maximum transmission power, the coverage of multiple-input multiple-output (Multiple-Input Multiple-Output, MIMO) can be improved, which cannot be achieved according to existing methods.

SUMMARY

A technical problem to be solved by the present disclosure is to provide an uplink power control method and device, to solve the problem that some terminals in related technologies cannot reach a maximum uplink transmission power during uplink multi-antenna transmission.

In a first aspect, an embodiment of the present disclosure provides an uplink power control method, applied to a terminal. The method includes:

obtaining an uplink precoding indication; and controlling a value of an uplink transmission power determined according to a power control procedure to remain unchanged, in a case that the uplink precoding indication corresponds to a target precoding indication.

According to some embodiments of the present disclosure, a step of controlling the value of the uplink transmission power determined according to the power control procedure to remain unchanged includes:

not scaling the uplink transmission power determined according to the power control procedure; or scaling, by a power scaling factor of 1, the uplink transmission power determined according to the power control procedure.

According to some embodiments of the present disclosure, after the obtaining the uplink precoding indication, the method further includes:

in a case that the uplink precoding indication corresponds to a precoding indication other than the target precoding indication, scaling the uplink transmission power determined according to the power control procedure, according to the number of antenna ports configured by a network device for the terminal or the number of uplink sounding reference signal (SRS) resources configured by a network device for the terminal.

According to some embodiments of the present disclosure, after obtaining the uplink precoding indication, the method further comprises: in a case that the uplink precoding indication corresponds to a transmission with a first number of streams and corresponds to a precoding indication other than the target precoding indication, scaling the uplink transmission power determined according to the power control procedure, according to the number of antenna ports configured by a network device for the terminal or the number of uplink sounding reference signal (SRS) resources configured by a network device for the terminal.

According to some embodiments of the present disclosure, the target precoding indication comprises a transmission precoding matrix indicator (TPMI) corresponding to a target codeword and/or a transmission rank indication (TRI) corresponding to the target codeword.

According to some embodiments of the present disclosure, the target codeword includes a codeword that only has a non-zero value on a target antenna port.

According to some embodiments of the present disclosure, the target antenna port includes an antenna port with a smallest index.

According to some embodiments of the present disclosure, the target precoding indication includes an SRS resource indication (SRI) for indicating a target SRS resource.

According to some embodiments of the present disclosure, the target SRS resource includes the SRS resource with the smallest sequence number.

According to some embodiments of the present disclosure, the target precoding indication includes a precoding indication for a single stream transmission.

According to some embodiments of the present disclosure, the target precoding indication is a pre-defined precoding indication; or the target precoding indication is obtained according to indication information of the target precoding indication transmitted by a network device, and the method further includes: receiving the indication information of the target precoding indication transmitted by the network device, and obtaining the target precoding indication according to the indication information.

According to some embodiments of the present disclosure, the method further includes:

determining a mapping relationship between a physical antenna and an antenna port according to the target precoding indication; and transmitting an uplink reference signal according to the mapping relationship.

According to some embodiments of the present disclosure, the scaling the uplink transmission power determined according to the power control procedure, according to the number of antenna ports configured by the network device for the terminal comprises:

obtaining a first ratio according to the precoding indication and the number of antenna ports that corresponds to an uplink transmission mode of a physical uplink shared channel (PUSCH) and is configured by a network for the terminal, where the first ratio is a ratio of the number of antenna ports with a non-zero PUSCH transmission power over the number of antenna ports that corresponds to the uplink transmission mode of the PUSCH of the terminal and is configured by the network device for the terminal; and scaling, according to the first ratio, the uplink transmission power determined according to the power control procedure.

According to some embodiments of the present disclosure, the scaling the uplink transmission power determined according to the power control procedure, according to the number of antenna ports configured by the network device for the terminal comprises:

obtaining a second ratio of a maximum number of antenna ports capable of being transmitted coherently that is supported by the terminal to the number of antenna ports that is configured by the network device for the terminal and corresponds to an uplink transmission mode of the physical uplink shared channel (PUSCH) of the terminal; and scaling, according to the second ratio, the uplink transmission power determined according to the power control procedure.

According to some embodiments of the present disclosure, the scaling the uplink transmission power determined according to the power control procedure, according to the number of uplink sounding reference signal (SRS) resources configured by the network device for the terminal comprises:

obtaining a third ratio of the number of SRS resources indicated by an SRS resource indication (SRI) to the number of SRS resources that is configured by the network device for the terminal and corresponds to an uplink transmission mode of the physical uplink shared channel (PUSCH) of the terminal; and scaling, according to the third ratio, the uplink transmission power determined according to the power control procedure.

According to some embodiments of the present disclosure, the method further includes:

receiving codebook subset restriction information transmitted by a network device; and determining, according to the codebook subset restriction information, whether the uplink precoding indication corresponds to the target precoding indication.

According to some embodiments of the present disclosure, different transmission modes correspond to different target precoding indications.

In a second aspect, embodiments of the present disclosure further provide a terminal, including:

an obtaining module configured to obtain uplink precoding indication; and a control module configured to control the value of the uplink transmission power determined according to the power control procedure to remain unchanged when the uplink precoding indication corresponds to the target precoding indication.

In a third aspect, embodiments of the present disclosure also provide a terminal, including a transceiver, a memory, a processor, and a computer program stored on the memory and running on the processor. The transceiver is configured to obtain an uplink precoding indication. The processor is configured to read the program in the memory and execute a following process: controlling a value of an uplink transmission power determined according to a power control procedure to remain unchanged, in a case that the uplink precoding indication corresponds to a target precoding indication.

According to some embodiments of the present disclosure, the processor is specifically configured to: not scale the uplink transmission power determined according to the power control procedure; or scale, according to a power scaling factor of 1, the uplink transmission power determined according to the power control procedure.

According to some embodiments of the present disclosure, the processor is further configured to: in a case that the uplink precoding indication corresponds to a precoding indication other than the target precoding indication, scale the uplink transmission power determined according to the power control procedure, according to the number of antenna ports configured by a network device for the terminal or the number of uplink sounding reference signal (SRS) resources configured by a network device for the terminal.

According to some embodiments of the present disclosure, the processor is further configured to: in a case that the uplink precoding indication corresponds to a transmission with a first number of streams and corresponds to a precoding indication other than the target precoding indication, scale the uplink transmission power determined according to the power control procedure, according to the number of antenna ports configured by a network device for the terminal or the number of uplink sounding reference signal (SRS) resources configured by a network device for the terminal.

According to some embodiments of the present disclosure, the target precoding indication comprises a transmission precoding matrix indicator (TPMI) corresponding to a target codeword and/or a transmission rank indication (TRI) corresponding to the target codeword.

According to some embodiments of the present disclosure, the target codeword includes a codeword that only has a non-zero value on the target antenna port.

According to some embodiments of the present disclosure, the target antenna port includes an antenna port with a smallest index.

According to some embodiments of the present disclosure, the target precoding indication includes an SRS resource indication (SRI) for indicating a target SRS resource.

According to some embodiments of the present disclosure, the target SRS resource includes an SRS resource with a smallest index.

According to some embodiments of the present disclosure, the target precoding indication includes a precoding indication for a single stream transmission.

According to some embodiments of the present disclosure, the target precoding indication is a pre-defined precoding indication; or the target precoding indication is obtained according to indication information of the target precoding indication transmitted by a network device, and the transceiver is further configured to: receive the indication information of the target precoding indication transmitted by the network device, and obtain the target precoding indication according to the indication information.

According to some embodiments of the present disclosure, the processor is further configured to: determine a mapping relationship between a physical antenna and an antenna port according to the target precoding indication; and transmit an uplink reference signal according to the mapping relationship.

According to some embodiments of the present disclosure, when scaling the uplink transmission power determined according to the power control procedure, according to the number of antenna ports configured by the network device for the terminal, the processor is specifically configured to: obtain a first ratio according to the precoding indication and the number of antenna ports that is configured by the network device for the terminal and corresponds to the uplink transmission mode of the physical uplink shared channel (PUSCH) of the terminal, where the first ratio is a ratio of the number of antenna ports with a non-zero PUSCH transmission power over the number of antenna ports that corresponds to the uplink transmission mode of the PUSCH of the terminal and is configured by the network device for the terminal; and scale, according to the first ratio, the uplink transmission power determined according to the power control procedure.

According to some embodiments of the present disclosure, when scaling the uplink transmission power determined according to the power control procedure, according to the number of antenna ports configured by the network device for the terminal, the processor is configured to: obtain a second ratio of a maximum number of antenna ports capable of being transmitted coherently that is supported by the terminal to the number of antenna ports that is configured by the network device for the terminal and corresponds to an uplink transmission mode of the physical uplink shared channel (PUSCH) of the terminal; and scale, according to the second ratio, the uplink transmission power determined according to the power control procedure.

According to some embodiments of the present disclosure, when scaling the uplink transmission power determined according to the power control procedure, according to the number of uplink sounding reference signal (SRS) resources configured by the network device for the terminal, the processor is configured to: obtain a third ratio of the number of SRS resources indicated by the SRS resource indication (SRI) to the number of SRS resources that is configured by the network device for the terminal and corresponds to an uplink transmission mode of the physical uplink shared channel (PUSCH) of the terminal; and scale, according to the third ratio, the uplink transmission power determined according to the power control procedure.

According to some embodiments of the present disclosure, the transceiver is further configured to: receive codebook subset restriction information transmitted by a network device; and the processor is further configured to determine, according to the codebook subset restriction information, whether the uplink precoding indication corresponds to the target precoding indication.

According to some embodiments of the present disclosure, different transmission modes correspond to different target precoding indications.

In a fourth aspect, embodiments of the present disclosure also provide a computer-readable storage medium, on which a computer program is stored. The program is executed by a processor to implement steps of the uplink power control method according to any of the above embodiments.

In a fifth aspect, embodiments of the present disclosure also provide an uplink power control method, which is applied to a network device. The method includes:

determining a transmission power assumption for determining an uplink precoding indication of a terminal;

determining the uplink precoding indication of the terminal according to the transmission power assumption; and transmitting the uplink precoding indication to the terminal.

According to some embodiments of the present disclosure, the determining the transmission power assumption for determining the uplink precoding indication of the terminal comprises:

determining an assumed coherent transmission capability of the terminal and an uplink transmission mode; and determining, according to the assumed coherent transmission capability of the terminal and/or the uplink transmission mode, the transmission power assumption for determining the uplink precoding indication of the terminal.

According to some embodiments of the present disclosure, the assumed coherent transmission capability of the terminal is a coherent transmission capability of the terminal obtained according to a terminal coherent transmission capability report; or the assumed coherent transmission capability of the terminal is a coherent transmission capability corresponding to a codebook subset restriction configured for the terminal.

According to some embodiments of the present disclosure, the determining, according to the assumed coherent transmission capability of the terminal and/or the uplink transmission mode, the transmission power assumption for determining the uplink precoding indication of the terminal comprises: in a case that a first target precoding exists in the uplink transmission mode, determining a transmission power assumption corresponding to the first target precoding to be that the terminal controls a value of an uplink transmission power determined according to a power control procedure to remain unchanged.

According to some embodiments of the present disclosure, the determining, according to the assumed coherent transmission capability of the terminal and/or the uplink transmission mode, the transmission power assumption for determining the uplink precoding indication of the terminal further comprises: determining a transmission power assumption corresponding to a precoding other than the first target precoding to be: that the terminal scales the uplink transmission power determined according to the power control procedure, according to the number of antenna ports configured by a network device for the terminal or the number of uplink sounding reference signal (SRS) resources configured by a network device for the terminal.

According to some embodiments of the present disclosure, the determining, according to the assumed coherent transmission capability of the terminal and/or the uplink transmission mode, the transmission power assumption for determining the uplink precoding indication of the terminal further comprises:

determining a transmission power assumption corresponding to a second target precoding in the uplink transmission mode to be that the terminal controls a value of an uplink transmission power determined according to a power control procedure to remain unchanged, in a case that the assumed coherent transmission capability of the terminal is non-coherent transmission; and/or, determining a transmission power assumption corresponding to a third target precoding in the uplink transmission mode to be that the terminal controls a value of an uplink transmission power determined according to a power control procedure to remain unchanged, in a case that the assumed coherent transmission capability of the terminal is partial coherent transmission.

According to some embodiments of the present disclosure, the uplink transmission mode is non-codebook-based uplink transmission, the assumed coherent transmission capability of the terminal is non-coherent transmission, and the determining, according to the assumed coherent transmission capability of the terminal and/or the uplink transmission mode, the transmission power assumption for determining the uplink precoding indication of the terminal further comprises: determining a transmission power assumption corresponding to another precoding than the second target precoding to be: that the terminal scales, according to a first ratio, the uplink transmission power determined according to the power control procedure, where the first ratio is a ratio of the number of antenna ports with a non-zero PUSCH transmission power corresponding to the other precoding over the number of antenna ports that corresponds to the uplink transmission mode of the PUSCH of the terminal and is configured by the network device for the terminal.

According to some embodiments of the present disclosure, the uplink transmission mode is non-codebook-based uplink transmission, the assumed coherent transmission capability of the terminal is partial coherent transmission, and the determining, according to the assumed coherent transmission capability of the terminal and/or the uplink transmission mode, the transmission power assumption for determining the uplink precoding indication of the terminal further comprises: determining a transmission power assumption corresponding to a precoding of a first stream number other than the third target precoding to be: that the terminal scales, according to a first ratio, the uplink transmission power determined according to the power control procedure, where the first ratio is a ratio of the number of antenna ports with a non-zero PUSCH transmission power corresponding to the precoding over the number of antenna ports that corresponds to the uplink transmission mode of the PUSCH of the terminal and is configured by the network device for the terminal.

According to some embodiments of the present disclosure, the uplink transmission mode is non-codebook-based uplink transmission, the assumed coherent transmission capability of the terminal is partial coherent transmission, and the determining, according to the assumed coherent transmission capability of the terminal and/or the uplink transmission mode, the transmission power assumption for determining the uplink precoding indication of the terminal further comprises: determining a transmission power assumption corresponding to a precoding corresponding to a single-stream transmission except the third target precoding to be: that the terminal scales, according to a second ratio, the uplink transmission power determined according to the power control procedure, where the second ratio is a ratio of a maximum number of antenna ports capable of being transmitted coherently that is supported by the terminal, to the number of antenna ports that is configured by the network device for the terminal and corresponds to an uplink transmission mode of the physical uplink shared channel (PUSCH) of the terminal.

According to some embodiments of the present disclosure, the uplink transmission mode is non-codebook-based uplink transmission, the assumed coherent transmission capability of the terminal is partial coherent transmission, and the determining, according to the assumed coherent transmission capability of the terminal and/or the uplink transmission mode, the transmission power assumption for determining the uplink precoding indication of the terminal further comprises:

determining a transmission power assumption corresponding to a precoding corresponding to a single-stream transmission to be: that the terminal scales, according to a second ratio, the uplink transmission power determined according to the power control procedure, where the second ratio is a ratio of a maximum number of antenna ports capable of being transmitted coherently that is supported by the terminal, to the number of antenna ports that is configured by the network device for the terminal and corresponds to an uplink transmission mode of the physical uplink shared channel (PUSCH) of the terminal.

According to some embodiments of the present disclosure, the uplink transmission mode is non-codebook-based uplink transmission, the assumed coherent transmission capability of the terminal is full coherent transmission, and the determining, according to the assumed coherent transmission capability of the terminal and/or the uplink transmission mode, the transmission power assumption for determining the uplink precoding indication of the terminal further comprises: determining a transmission power assumption corresponding to any precoding to be that the terminal controls a value of an uplink transmission power determined according to a power control procedure to remain unchanged.

According to some embodiments of the present disclosure, the method further includes: transmitting, to the terminal, indication information for indicating the first target precoding.

According to some embodiments of the present disclosure, the method further includes: transmitting, to the terminal, indication information for indicating the second target precoding and/or the third target precoding.

In a sixth aspect, embodiments of the present disclosure also provide a network device, including:

a first determining module configured to determine a transmission power assumption for determining an uplink precoding indication of a terminal;

a second determining module configured to determine the uplink precoding indication of the terminal according to the transmission power assumption; and a first transmitting module configured to transmit the uplink precoding indication to the terminal.

In a seventh aspect, embodiments of the present disclosure also provide a network device, including a transceiver, a memory, a processor, and a computer program stored on the memory and executable on the processor. The processor is configured to read the program in the memory and execute following processes: determining a transmission power assumption for determining an uplink precoding indication of a terminal; and determining the uplink precoding indication of the terminal according to the transmission power assumption. The transceiver is configured to transmit the uplink precoding indication to the terminal.

According to some embodiments of the present disclosure, the processor is further configured to: determine an assumed coherent transmission capability of the terminal and an uplink transmission mode; and determine, according to the assumed coherent transmission capability of the terminal and/or the uplink transmission mode, the transmission power assumption for determining the uplink precoding indication of the terminal.

According to some embodiments of the present disclosure, the assumed coherent transmission capability of the terminal is a coherent transmission capability of the terminal obtained according to a terminal coherent transmission capability report; or the assumed coherent transmission capability of the terminal is a coherent transmission capability corresponding to a codebook subset restriction configured for the terminal.

According to some embodiments of the present disclosure, the processor is further configured to: in a case that a first target precoding exists in the uplink transmission mode, determine a transmission power assumption corresponding to the first target precoding to be that the terminal controls a value of an uplink transmission power determined according to a power control procedure to remain unchanged.

According to some embodiments of the present disclosure, the processor is further configured to: determine a transmission power assumption corresponding to a precoding other than the first target precoding to be: that the terminal scales the uplink transmission power determined according to the power control procedure, according to the number of antenna ports configured by a network device for the terminal or the number of uplink sounding reference signal (SRS) resources configured by a network device for the terminal.

According to some embodiments of the present disclosure, the processor is further configured to: determine a transmission power assumption corresponding to a second target precoding in the uplink transmission mode to be that the terminal controls a value of an uplink transmission power determined according to a power control procedure to remain unchanged, in a case that the assumed coherent transmission capability of the terminal is non-coherent transmission; and/or, determine a transmission power assumption corresponding to a third target precoding in the uplink transmission mode to be that the terminal controls a value of an uplink transmission power determined according to a power control procedure to remain unchanged, in a case that the assumed coherent transmission capability of the terminal is partial coherent transmission.

According to some embodiments of the present disclosure, the uplink transmission mode is non-codebook-based uplink transmission, the assumed coherent transmission capability of the terminal is non-coherent transmission, and the processor is further configured to: determine a transmission power assumption corresponding to another precoding than the second target precoding to be: that the terminal scales, according to a first ratio, the uplink transmission power determined according to the power control procedure, where the first ratio is a ratio of the number of antenna ports with a non-zero PUSCH transmission power corresponding to the other precoding over the number of antenna ports that corresponds to the uplink transmission mode of the PUSCH of the terminal and is configured by the network device for the terminal.

According to some embodiments of the present disclosure, the uplink transmission mode is non-codebook-based uplink transmission, the assumed coherent transmission capability of the terminal is partial coherent transmission, and the processor is further configured to: determine a transmission power assumption corresponding to a precoding of a first stream number other than the third target precoding to be: that the terminal scales, according to a first ratio, the uplink transmission power determined according to the power control procedure, where the first ratio is a ratio of the number of antenna ports with a non-zero PUSCH transmission power corresponding to the precoding over the number of antenna ports that corresponds to the uplink transmission mode of the PUSCH of the terminal and is configured by the network device for the terminal.

According to some embodiments of the present disclosure, the uplink transmission mode is non-codebook-based uplink transmission, the assumed coherent transmission capability of the terminal is partial coherent transmission, and the processor is further configured to: determine a transmission power assumption corresponding to a precoding corresponding to a single-stream transmission except the third target precoding to be: that the terminal scales, according to a second ratio, the uplink transmission power determined according to the power control procedure, where the second ratio is a ratio of a maximum number of antenna ports capable of being transmitted coherently that is supported by the terminal, to the number of antenna ports that is configured by the network device for the terminal and corresponds to an uplink transmission mode of the physical uplink shared channel (PUSCH) of the terminal.

According to some embodiments of the present disclosure, the uplink transmission mode is non-codebook-based uplink transmission, the assumed coherent transmission capability of the terminal is partial coherent transmission, and the processor is further configured to: determine a transmission power assumption corresponding to a precoding corresponding to a single-stream transmission to be: that the terminal scales, according to a second ratio, the uplink transmission power determined according to the power control procedure, where the second ratio is a ratio of a maximum number of antenna ports capable of being transmitted coherently that is supported by the terminal to the number of antenna ports that is configured by the network device for the terminal and corresponds to an uplink transmission mode of the physical uplink shared channel (PUSCH) of the terminal.

According to some embodiments of the present disclosure, the uplink transmission mode is non-codebook-based uplink transmission, the assumed coherent transmission capability of the terminal is full coherent transmission, and the processor is further configured to: determine a transmission power assumption corresponding to any precoding to be that the terminal controls a value of an uplink transmission power determined according to a power control procedure to remain unchanged.

According to some embodiments of the present disclosure, the transceiver is further configured to transmit, to the terminal, indication information for indicating the first target precoding.

According to some embodiments of the present disclosure, the transceiver is further configured to transmit, to the terminal, indication information for indicating the second target precoding and/or the third target precoding.

In an eighth aspect, embodiments of the present disclosure also provide a computer-readable storage medium, on which a computer program is stored. The program is executed by a processor to implement steps of the uplink power control method according to any of the above embodiments.

The above technical solutions of the present disclosure have beneficial effects as follows:

according to the uplink power control method of the embodiments of the present disclosure, after an uplink precoding indication is obtained, in a case that the uplink precoding indication corresponds to a target precoding indication, a value of an uplink transmission power determined according to a power control procedure is controlled to remain unchanged. In such a manner, it is ensured that a maximum uplink transmission power can be reached under part of precoding indications, and the coverage of uplink transmission can be improved. For example, when a terminal performs uplink MIMO transmissions at a low rank and not based on a codebook, some of pre-codings can reach the maximum uplink transmission power; and when a terminal with non-coherent transmission capability or partial coherent transmission capability performs uplink MIMO transmissions at a low rank and based on a codebook, some of pre-codings can reach the maximum uplink transmission power; and it is not required that all antennas of the terminal can reach the maximum transmission power, thereby reducing the cost.

BRIEF DESCRIPTION OF THE DRAWINGS

In order to explain the technical solutions of the embodiments of the present disclosure more clearly, the drawings that need to be used in the description of the embodiments of the present disclosure will be briefly introduced below. Obviously, the drawings in the following description are only some embodiments of the present disclosure. For those of ordinary skill in the art, other drawings can be obtained based on these drawings without creative effort.

DETAILED DESCRIPTION

In order to make a technical problem to be solved by the present disclosure, a technical solution and advantages clearer, they are described hereinafter in detail with reference to the drawings and specific embodiments.

Figure 1:
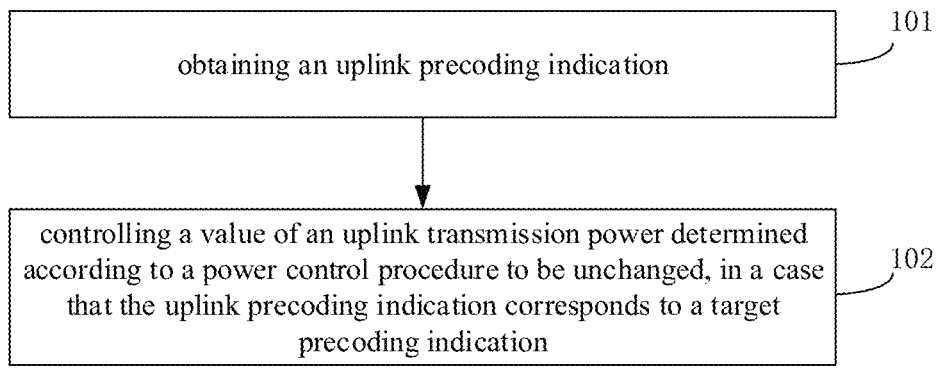
FIG. 1 is a flowchart of an uplink power control method provided by an embodiment of the disclosure.

In some embodiments of the present disclosure, referring to FIG. 1, an uplink power control method is provided, which is applied to a terminal, and the method includes:

step 101: obtaining an uplink precoding indication; and step 102: controlling a value of an uplink transmission power determined according to a power control procedure to remain unchanged, in a case that the uplink precoding indication corresponds to a target precoding indication.

In the uplink power control method according to the embodiment of the present disclosure, in a case that the uplink precoding indication corresponds to the target precoding indication, the value of the uplink transmission power determined according to the power control procedure is controlled to remain unchanged, which ensures that a maximum transmission power can be reached, when the precoding indication received by a terminal at a low signal-to-noise ratio is the target precoding indication, thereby improving the performance of uplink coverage. For example, when the terminal performs uplink MIMO transmissions at a low rank and not based on a codebook, an uplink transmission corresponding to the target precoding indication can reach a maximum uplink transmission power; when a terminal with non-coherent transmission capability or partial coherent transmission capability performs uplink MIMO transmissions based on a codebook, an uplink transmission corresponding to the target precoding indication can reach a maximum uplink transmission power; and it is not required that all antennas of the terminal can reach the maximum transmission power, thereby reducing the cost. In addition, as compared with that for all the uplink transmissions corresponding to precoding indications, an uplink transmission power determined according to a power control procedure is scaled (a scaling factor is less than 1) according to antenna ports, the uplink transmission power of the terminal can be higher in the embodiments when the precoding indication received by the terminal is a target precoding indication, thus better performance can be obtained.

According to some embodiments of the present disclosure, the above step 102 includes:

step 1021: not scaling the uplink transmission power determined according to the power control procedure; or step 1022: scaling, by a power scaling factor of 1, the uplink transmission power determined according to the power control procedure.

In these embodiments, when the uplink precoding indication corresponds to the target precoding indication, the uplink transmission power determined according to the power control procedure is not scaled, or the uplink transmission power determined according to the power control procedure is scaled according to a power scaling factor of 1, which ensures that the maximum transmission power can be reached under some precoding indications, thereby improving the performance. Furthermore, when transmitting a physical uplink shared channel (PUSCH), the uplink transmission power determined according to the power control procedure is not scaled, but the uplink transmission power determined according to the power control procedure is directly allocated to an antenna port where the PUSCH is transmitted at non-zero power.

According to some embodiments of the present disclosure, the uplink transmission power determined according to the power control procedure is determined by the terminal, according to the specification of the power control procedure, from information such as power control indication information from a base station, path fading information estimated by a terminal, and a maximum uplink output power. For example, in the LTE systems, the uplink transmission power determined according to the power control procedure is $\hat{P}_{PUSCH,c}(i)$ determined with reference to the specification of the PUSCH transmission power in subclause 5.1.1 of the 3 GPP protocol TS36.213 during PUSCH transmission.

According to some embodiments of the present disclosure, the target precoding indication is a pre-defined precoding indication; or the target precoding indication is obtained according to indication information of the target precoding indication transmitted by a network device, and the method further includes: receiving the indication information of the target precoding indication transmitted by the network device, and obtaining the target precoding indication according to the indication information.

In these embodiments, the target precoding indication may be a pre-defined precoding indication, or the target precoding indication may be a precoding indication notified by signaling.

According to some embodiments of the present disclosure, a pre-defined manner of the target precoding indication may be a direct manner or an indirect manner.

For example, the target precoding indication is pre-defined by a network device and a terminal device, for example, agreed by a protocol. The protocol defines that when the precoding indication corresponds to a certain specific value, the terminal does not scale a transmission power of an uplink signal calculated according to ta power control formula, and directly allocates it to antenna ports where a non-zero transmission power is used (antenna ports with a non-zero PUSCH transmission power).

In a case that an uplink transmission is a codebook-based (codebook based) PUSCH transmission, an antenna port with a non-zero transmission power is interpreted as that: antenna ports corresponding to any non-zero element in a precoding matrix indicated by the network device are antenna ports with a non-zero PUSCH transmission power. For example, for a PUSCH transmitted by 4 antenna ports, a network device may indicate a precoding matrix with 4 rows and R columns to a terminal. R corresponds to the number of streams (rank) indicated by the network device for the PUSCH, and each row of the precoding matrix corresponds to one PUSCH antenna port. Accordingly, if there is an element that is not 0 in a row of the precoding matrix, an antenna port corresponding to this row is an antenna port with a non-zero PUSCH transmission power; if all elements in a row are 0, the PUSCH antenna port corresponding to this row is not an antenna port with a non-zero PUSCH transmission power.

In a case that an uplink transmission is non-codebook-based (non-codebook based) PUSCH transmission, an antenna port with a non-zero transmission power is interpreted as: a PUSCH antenna port corresponding to an SRS resource indicated by the network device. For example, it is assumed that 4 SRS resources are configured in an SRS resource set of a non-codebook type, and each of the SRS resources corresponds to a PUSCH antenna port. Accordingly, a PUSCH port corresponding to an SRS resource indicated by the network device through SRI (SRS resource indicator) is an antenna port with a non-zero transmission power; and a PUSCH port corresponding to an SRS resource not indicated by the network device is not an antenna with a non-zero transmission power.

Optionally, the terminal evenly allocates the transmission power of the uplink signal calculated according to the power control formula to antenna ports with a non-zero power, and transmits an uplink signal by using the allocated power.

For example, a direct pre-defined manner is: pre-defining a precoding indication to be a target precoding indication when an index (sequence number) of a TPMI is equal to 0. Another direct pre-defined manner is: pre-defining a precoding indication to be a target precoding indication when SRI corresponds to a certain value or some values.

Some indirect manners are included:

one way is to pre-define that when a value of TPMI corresponds to some pre-defined values, the terminal does not scale the uplink transmission power determined according to the power control procedure, according to a ratio of antenna ports;

one way is to pre-define that when a value of TPMI corresponds to some pre-defined values, the terminal scales the uplink transmission power determined according to the power control procedure, by a scale factor of 1 for antenna ports;

one way is to pre-define that when a value of TPMI corresponds to some pre-defined values, a transmission power that is determined according to the power control procedure and is scaled by a ratio of antenna ports by the terminal is equal to the uplink transmission power determined according to the power control procedure;

one way is to pre-define that when a value of SRI corresponds to some pre-defined values, the terminal does not scale the uplink transmission power determined according to the power control procedure, according to a ratio of antenna ports;

one way is to pre-define that when a value of SRI corresponds to some pre-defined values, the terminal scales the uplink transmission power determined according to the power control procedure, by a scale factor of 1 for antenna ports;

one way is to pre-define that when a value of SRI corresponds to some pre-defined value, a transmission power that is determined according to the power control procedure and is scaled by a ratio of antenna ports by the terminal is equal to the uplink transmission power determined according to the power control procedure; and one way is to set normalized powers of some codewords that only use some antenna ports in a codebook to 1. The precoding indication corresponding to these codewords may be considered to correspond to the target precoding indication.

Notably, there may also be some other methods not listed, which shall fall within the scope of the present disclosure.

According to some embodiments of the present disclosure, the network device transmits indication information of the target precoding indication to the terminal through RRC signaling.

According to some embodiments of the present disclosure, the target precoding indication includes transmit precoding matrix indicator (Transmit Precoding Matrix Indicator, TPMI) corresponding to a target codeword and/or transmit rank indication (Transmit Rank Indication, TRI) corresponding to the target codeword.

For example, when an uplink transmission scheme is a codebook-based uplink transmission, the precoding indication is indicated by a field of precoding information and the number of streams (Precoding information and number of layers) in DCI (Downlink Control Information), and the precoding indication includes TPMI and TRI corresponding to an uplink transmission corresponding to the precoding. The target precoding indication is a value of Precoding information and number of layers corresponding to the target codeword.

According to some embodiments of the present disclosure, the number of the target precodings may be one or multiple.

According to some embodiments of the present disclosure, the target precoding indication includes a precoding indication for a single-stream transmission.

According to some embodiments of the present disclosure, all the target precoding indications are precoding indications corresponding to codewords for single-stream transmission.

According to some embodiments of the present disclosure, some of the target precoding indications correspond to one or more codewords for single-stream transmission, and some other precoding indications correspond to one or more codewords for multi-stream transmission.

According to some embodiments of the present disclosure, the target precoding indication includes a precoding indication corresponding to a target codeword.

According to some embodiments of the present disclosure, the target codeword is a pre-defined codeword; or the target codeword is transmitted to the terminal by the network device through indication information of a target codeword. The method further includes: receiving the indication information of the target codeword transmitted by the network device, and obtaining the target codeword according to the indication information.

According to some embodiments of the present disclosure, the target codeword is indicated by the terminal to the network device through signaling.

According to some embodiments of the present disclosure, the target codeword is a codeword determined according to the power capability of an antenna port of a terminal. For example, when a power capability of a terminal is that all antenna ports of the terminal are capable of being transmitted at a full power, the target codewords are all codewords. For another example, when a power capability of antenna ports of a terminal is that the sum of output powers of any two antenna ports can reach full power (for example, the sum of maximum output powers of any two antenna ports can meet the maximum output power requirement corresponding to a power level of the terminal), the target codeword is a codeword that has at least two antenna ports with a non-zero transmission power. For another example, when a power capability of antenna ports of a terminal is that the sum of output powers of any two antenna ports can reach full power (for example, the sum of maximum output powers of any two antenna ports can meet the maximum output power requirement corresponding to a power level of the terminal), the target codeword is a codeword that has two antenna ports or four antenna ports with a non-zero transmission power.

According to some embodiments of the present disclosure, the target codeword includes a codeword that only has a non-zero value on the target antenna port.

In these embodiments, the target precoding indication includes a precoding indication corresponding to a codeword with a non-zero value only on the target antenna port.

According to some embodiments of the present disclosure, the target precoding indication includes a precoding indication corresponding to a codeword with a non-zero value only on the target antenna port.

According to some embodiments of the present disclosure, the target precoding indication includes all precoding indications corresponding to all codewords that have non-zero values only on the target antenna port.

For example, the target precoding indication includes a precoding indication corresponding to a codeword with a non-zero value only on the first antenna port (arranging in ascending order of sequence numbers) in a codebook when a network device configures two antenna ports for a terminal. For another example, the target precoding indication includes a precoding indication corresponding to a codeword with a non-zero value only on the second antenna port (in ascending order of sequence number) in the codebook when the network device configures 4 antenna ports for the terminal, etc. However, the present disclosure is not limited thereto.

According to some embodiments of the present disclosure, the aforementioned target antenna port is a pre-defined antenna port; or the target antenna port is transmitted by the network device to the terminal through indication information of a target antenna port. The method further includes: receiving the indication information of the target antenna port transmitted by the network device, and obtaining the target antenna port according to the indication information.

According to some embodiments of the present disclosure, the target antenna port is an antenna port indicated by the terminal to the network device through signaling, which, for example, is an antenna port reported by the terminal where a transmission is performed at a full power. The method further includes: transmitting the indication information of the target antenna port to the network device.

According to some embodiments of the present disclosure, the target antenna port is an antenna port through which the terminal can perform transmission at a full power. An antenna port where a transmission can be performed at a full power refers to an antenna port whose maximum output power can reach the maximum output power requirement corresponding to a power level of the terminal. For example, the RAN4 protocol defines that the maximum output power of a UE of a Power class 3 is 23 dBm, and if a maximum output power of an antenna port can reach 23 dBm, this antenna port is an antenna port with a full transmission power.

For example, a UE supports up to 4 antenna ports in one SRS resource (that is, the UE supports PUSCH transmission on up to 4 antenna ports). If the first antenna port and the third antenna port are antenna ports with a full transmission power (i.e., the first antenna port and the third antenna port are target antenna ports). When a precoding matrix indicated by a network device through a PUSCH precoding matrix indication has non-zero values at the first antenna port and the third antenna port, and values of the precoding matrix at the other antenna ports are all zero, the terminal uniformly assigns a transmission power calculated according to a PUSCH power control formula to antenna ports with non-zero values for transmission. For example, if a precoding matrix indicated by a base station is $[1\ 0\ j\ 0]^T$, this precoding matrix indication is a target precoding indication, and the terminal may directly and evenly distribute the transmission power calculated according to the PUSCH power control formula to the first antenna port and the third antenna port for transmission. If a precoding matrix indicated by a base station is $[1\ 1\ j\ j]^T$, this precoding matrix indication is not a target precoding indication.

According to some embodiments of the present disclosure, the target antenna port includes an antenna port with a smallest sequence number.

According to some embodiments of the present disclosure, the target antenna port is an antenna port with a smallest sequence number.

In these embodiments, the target precoding indication is a precoding indication corresponding to a codeword with a non-zero value only on the antenna port with the smallest sequence number.

According to some embodiments of the present disclosure, the target precoding indication includes indication information for indicating a target uplink reference signal.

According to some embodiments of the present disclosure, the target precoding indication includes an SRS resource indication (SRI) for indicating a target SRS resource.

For example, during an uplink transmission not based on a codebook, the precoding indication is SRI (SRS resource indicator), which may be obtained through an "SRS resource indicator" field in a DCI, and the SRI indicates an SRS resource corresponding to a PUSCH transmission. The terminal may also obtain the number of streams of the uplink transmission according to the SRI.

According to some embodiments of the present disclosure, the target precoding indication includes an SRI for indicating only the first SRS resource (arranged in ascending order of sequence numbers configured for SRS resources). For another example, the target precoding indication includes an SRI for indicating the first two SRS resources (arranged in ascending order of sequence numbers configured for SRS resources).

According to some embodiments of the present disclosure, the target SRS resource includes an SRS resource with a smallest sequence number. In this case, the target precoding indication includes an SRI indicating the SRS resource with the smallest sequence number.

According to some embodiments of the present disclosure, the target SRS resource is an SRS resource with a smallest sequence number.

According to some embodiments of the present disclosure, the target precoding indication is one or more SRIs for indicating only a target SRS resource.

According to some embodiments of the present disclosure, the target precoding indication includes all SRIs for indicating a target SRS resource.

According to some embodiments of the present disclosure, the target precoding indication is a precoding indication corresponding to a codeword with a non-zero value only on an antenna port with a smallest sequence number in case of single-stream transmission.

For example, in the 3GPP NR systems, when a target precoding indication for a codebook-based uplink transmission is a TMPI corresponding to a codeword with a non-zero value only on an antenna port with a smallest sequence number in single-stream transmission, and accordingly, a codeword corresponding to a precoding without scaling an uplink transmission power determined in a power control procedure according to a ratio of antenna ports is:

$$\frac{1}{\sqrt{2}}\begin{bmatrix}1\\0\end{bmatrix},$$

when the number of antenna ports configured for the terminal is 2; and $$\frac{1}{2}\begin{bmatrix}1\\0\\0\\0\end{bmatrix},$$

when the number of antenna ports configured for the terminal is 4.

For example, it is supposed that the target precoding indication is a precoding indication corresponding to a codeword with a non-zero value only on an antenna port with a smallest sequence number in single-stream transmission. In a case that a codeword corresponding to an uplink precoding indication is $$\frac{1}{\sqrt{2}}\begin{bmatrix}1\\0\end{bmatrix},$$

that is, the number of antenna ports configured for a PUSCH is 2, a value corresponding to one antenna port in the codeword is non-zero, and a value corresponding to the other antenna port is 0, according to the existing methods, a total transmission power of the PUSCH corresponding to the codeword is ½ of the uplink transmission power determined according to a power control procedure. According to the embodiments of the present disclosure, this uplink precoding indication corresponds to the target precoding indication, and the total transmission power of the PUSCH corresponding to the codeword is equal to a value of the uplink transmission power determined according to the power control procedure. That is, the uplink transmission power determined according to the power control procedure is not scaled, or the uplink transmission power determined according to the power control procedure is scaled according to a power scaling factor of 1. In a case that the uplink precoding indication does not correspond to the target precoding indication, the uplink transmission power determined according to the power control procedure may be scaled according to the uplink precoding indication and the number of antenna ports configured by the network device for the terminal.

For example, assuming that the target precoding indication is a precoding indication corresponding to a codeword with a non-zero value only on an antenna port with a smallest sequence number in single-stream transmission. In a case that a codeword of an uplink precoding indication is $$\frac{1}{2}\begin{bmatrix}1\\0\\0\\0\end{bmatrix},$$

that is, the number of antenna ports configured for a PUSCH is 4, a value corresponding to one antenna port in the codeword is non-zero, and values corresponding to other antenna ports are 0, according to the existing methods, a total transmission power of the PUSCH corresponding to the codeword is ¼ of the uplink transmission power determined according to a power control procedure. According to the embodiments of the present disclosure, this uplink precoding indication corresponds to the target precoding indication, and the total transmission power of the PUSCH corresponding to the codeword is equal to a value of the uplink transmission power determined according to the power control procedure, and is unchanged. That is, the uplink transmission power determined according to the power control procedure is not scaled, or the uplink transmission power determined according to the power control procedure is scaled according to a power scaling factor of 1. In a case that the uplink precoding indication does not correspond to the target precoding indication, the uplink transmission power determined according to the power control procedure may be scaled according to the uplink precoding indication and the number of antenna ports configured by the network device for the terminal.

According to some embodiments of the present disclosure, in a case that an uplink transmission is based on a codebook, a normalization factor of a codeword corresponding to the target precoding indication is to enable a normalized power of the codeword to be 1. The normalized power of the codeword refers to the sum of powers of all positions in the codeword, that is, a square of values of all positions in the codeword. For example, a normalized power of a codeword $$\frac{1}{\sqrt{2}}\begin{bmatrix}0\\1\end{bmatrix}$$

is ½, and a normalized power of a codeword $$\begin{bmatrix}1\\0\end{bmatrix}$$

is 1. For example, if the target precoding indication corresponds to a codeword with a non-zero value for only an antenna port with a smallest sequence number, an uplink codebook corresponding to single-stream transmission in a current 3GPP NR system may be modified to:

TABLE 6.3.1.5-1: precoding matrix W for single-layer transmission using two antenna ports

| TPMI index | W (ordered from left to right in increasing order of TPMI index) |
|---|---|
| 0-5 | $\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

TABLE 6.3.1.5-2: precoding matrix W for single-layer transmission using four antenna ports with transform precoding enabled (a codebook of 4-antenna port for single-layer transmission corresponding to a DFT-S-OFDM waveform)

| TPMI index | W (ordered from left to right in increasing order of TPMI index) |
|---|---|
| 0-7 | $\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |

TABLE 6.3.1.5-2: precoding matrix W for single-layer transmission using four antenna ports with transform precoding enabled (a codebook of 4-antenna port for single-layer transmission corresponding to a DFT-S-OFDM waveform)

| TPMI index | W (ordered from left to right in increasing order of TPMI index) |
|---|---|
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

TABLE 6.3.1.5-3: precoding matrix W for single-layer transmission using four antenna ports with transform precoding disabled (a codebook of 4-antenna port for single-layer transmission corresponding to a CP-OFDM waveform)

| TPMI index | W (ordered from left to right in increasing order of TPMI index) |
|---|---|
| 0-7 | $\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

In a case that an uplink transmission is not based on a codebook, the target precoding indication may be an SRI indicating only an SRS resource with a smallest sequence number, for example, the target precoding indication is an SRI for indicating only the first SRS resource (ordered according to ascending sequence numbers of configured SRS resources). If the SRI indicated by the network device only corresponds to the first SRS resource, according to embodiments of the present disclosure, this uplink precoding indication SRI corresponds to the target precoding indication, and the total transmission power of the corresponding PUSCH is equal to a value of the uplink transmission power determined according to the power control procedure, and keeps unchanged. That is, the uplink transmission power determined according to the power control procedure is not scaled, or the uplink transmission power determined according to the power control procedure is scaled according to a power scaling factor of 1. In a case that an SRI indicated by the network device not only corresponds to the first SRS resource (for example, the SRI corresponds to the first and second SRS resources) or does not correspond to the first SRS resource (for example, the SRI corresponds to the third SRS resource), etc., the total uplink transmission power of the corresponding PUSCH may be an uplink transmission power that is determined according to a power control procedure and is then scaled.

According to some embodiments of the present disclosure, the methods in the embodiments of the present disclosure may only be applicable to certain specific types of terminals. For example, it is only applicable to terminals with non-coherent transmission capabilities. For another example, it is only applicable to terminals with non-coherent transmission capabilities or partial coherent transmission capabilities.

According to some embodiments of the present disclosure, the method in the embodiments of the present disclosure may be applicable to certain types of terminals in a transmission mode, and applicable to other types of terminals in another transmission mode. For example, in a codebook based transmission mode, the method is applicable to terminals with coherent transmission capabilities or partial coherent transmission capabilities, and in a non-codebook based transmission mode, the method is applicable to all terminals.

According to some embodiments of the present disclosure, terminals with different coherent transmission capabilities may correspond to different target precoding indications.

According to some embodiments of the present disclosure, a same terminal may correspond to different target precoding indications in different transmission modes.

As an embodiment, under the configuration of N antenna ports, the number of the target precodings may be multiple. For example, the number of the target precodings in a non-codebook-based transmission mode may be 2, and the target precoding is an SRI for indicating only the first SRS resource (arranged in ascending order of sequence numbers), and an SRI for indicating the first and second SRS antenna resources. That is, when the SRS resource indicated by the SRI is the first SRS resource or the SRS resource indicated by the SRI is the first and second SRS resources, a total uplink transmission power corresponding to the uplink transmission is equal to the uplink transmission power determined according to the power control procedure, which is not scaled with respect to a ratio of antenna ports. When an SRS resource indicated by the SRI is another SRS resource, for example, only the second SRS resource is indicated, or other SRS resource is indicated, the total uplink transmission power corresponding to the uplink transmission is an uplink transmission power that is determined according to the power control procedure, and is further scaled by a ratio of antenna ports.

In a case that the target precoding indication is present (that is, the target precoding indication is pre-defined or notified by signaling), a terminal needs to perform mapping between physical antennas and antenna ports in accordance with a codeword or a resource corresponding to the target precoding indication, when transmitting an uplink reference signal (such as SRS) corresponding to an uplink transmission mode.

According to some embodiments of the present disclosure, the method further includes: determining a mapping relationship between a physical antenna and an antenna port according to the target precoding indication; and transmitting the uplink reference signal according to the mapping relationship.

In this case, when a terminal transmits an uplink reference signal (for example, SRS) corresponding to the uplink transmission mode, the terminal perform mapping between physical antennas and antenna ports in accordance with a codeword or a resource corresponding to the target precoding indication.

For example, in codebook-based uplink transmission, in a case that the target precoding indication corresponds to a codeword with a non-zero value only at an antenna port with a smallest sequence number (for example, $$\frac{1}{\sqrt{2}}\begin{bmatrix}1\\0\end{bmatrix}$$

), a terminal needs to perform transmission by using a first SRS antenna port where a maximum transmission power can be reached.

It should be noted that the partial coherent transmission capability of a terminal in the embodiments of the present disclosure are not limited to the partial coherent transmission capability defined in the 3GPP NR systems. In the 3GPP NR systems, a capability where only a pair of antennas can perform coherent transmission is considered to a partial coherent transmission capability. In the embodiments of the present disclosure, the partial coherent transmission capability may also have a same definition as the partial coherent transmission capability in the 3GPP NR system, or other definitions. For example, as long as not all antennas can perform coherent transmission, and not all antennas cannot perform coherent transmission, the terminal is considered to have a partial coherent transmission capability.

For a manner in which a network device transmits indication information of the target precoding indication to a terminal, optionally, the indication information directly indicates an index or a value of the target precoding indication. Optionally, the indication information includes indication information of a codeword corresponding to the target precoding indication. Optionally, the indication information includes indication information of an antenna port corresponding to the target precoding indication. Optionally, the indication information includes indication information of the number of streams corresponding to the target precoding indication.

According to some embodiments of the present disclosure, subsequent to the above step 101, the method further includes step 103: in a case that an uplink precoding indication corresponds to a precoding indication other than the target precoding indication, scaling the uplink transmission power determined according to the power control procedure, according to the number of antenna ports configured by a network device for the terminal or the number of uplink sounding reference signal (SRS) resources configured by a network device for the terminal.

In this case, when an uplink precoding indication corresponds to the precoding indication other than the target precoding indication, that is, when the uplink precoding indication does not correspond to the target precoding indication, the uplink transmission power determined according to the power control procedure is scaled by a ratio of antenna ports according to the number of antenna ports configured by a network device for the terminal or the number of SRS resources configured by a network device for the terminal, which can achieve the effect of not requiring all antennas of the terminal to reach a maximum output power, thereby reducing the implementation cost of the terminal.

In a codebook-based uplink transmission mode, when an uplink precoding indication corresponds to a precoding indication other than the target coding indication, the uplink transmission power determined according to the power control procedure can be scaled based on the uplink precoding indication and the number of antenna ports configured by the network device for the terminal.

In a non-codebook-based uplink transmission mode, when an uplink precoding indication corresponds to a precoding indication other than the target coding indication, the uplink transmission power determined according to the power control procedure can be scaled based on the uplink precoding indication and the number of SRS resources configured by the network device for the terminal.

According to some embodiments of the present disclosure, when an uplink precoding indication corresponds to a precoding indication other than the target coding indication, the uplink transmission power determined according to the power control procedure can be scaled by using a scaling factor less than 1, according to the number of antenna ports configured by the network device for the terminal or the number of uplink sounding reference signal (SRS) resources.

According to some embodiments of the present disclosure, subsequent to the above step 101, the method further includes step 104: in a case that the uplink precoding indication corresponds to a transmission where the number of streams is a first number and corresponds to a precoding indication other than the target precoding indication, scaling the uplink transmission power determined according to the power control procedure, according to the number of antenna ports configured by a network device for the terminal or the number of uplink sounding reference signal (SRS) resources configured by a network device for the terminal.

In this case, when the uplink precoding indication corresponds to the transmission of the first stream number, and the uplink precoding indication corresponds to a precoding indication except the target coding indication, that is, when the uplink precoding indication does not correspond to the target precoding indication, the scaling the uplink transmission power determined according to the power control procedure by a ratio of antenna ports can achieve the effect of not requiring all antennas of the terminal to reach a maximum output power, thereby reducing the implementation cost of the terminal.

The first stream number may be a single stream or multiple streams, such as 2 streams, 3 streams, 4 streams, and so on.

In non-codebook-based uplink transmissions, for terminals with partial coherent transmission capabilities, a power scaling manner may be used when the uplink precoding indication corresponds to single-stream transmission, and another power scaling manner may be used when the uplink precoding indication corresponds to multiple streams (such as 2 streams, 3 streams or 4 streams).

According to some embodiments of the present disclosure, in a case that the uplink precoding indication corresponds to a transmission of a first stream number and corresponds to a precoding indication other than the target precoding indication, the uplink transmission power determined according to the power control procedure is scaled by a scaling factor less than 1, according to the number of antenna ports configured by a network device for the terminal or the number of uplink sounding reference signal (SRS) resources configured by a network device for the terminal.

Several power scaling manners provided by embodiments of the present disclosure are described below.

In a first manner, according to some embodiments of the present disclosure, in step 103 or 104, a step of scaling the uplink transmission power determined according to the power control procedure, according to the number of antenna ports configured by the network device for the terminal includes following steps:

step 1051: obtaining a first ratio of the number of antenna ports with a non-zero PUSCH transmission power over the number of antenna ports that corresponds to the uplink transmission mode of the PUSCH of the terminal and is configured by the network device for the terminal, according to the precoding indication and the number of antenna ports corresponding to the uplink transmission mode of the physical uplink shared channel (PUSCH) of the terminal configured by the network device for the terminal.

It is supposed that the number of antenna ports corresponding to the PUSCH with a non-zero power is denoted as $Q_{used1}$, and the number of antenna ports corresponding to the uplink transmission mode of the terminal PUSCH configured by the network device for the terminal is denoted as $Q_{configured1}$, the first ratio K1 is obtained: $K1=Q_{used1}/Q_{configured1}$.

Step 1052: scaling, according to the first ratio, the uplink transmission power determined according to the power control procedure.

The uplink transmission power determined according to the power control procedure is scaled by the first ratio K1, which reduces the implementation cost of the terminal.

For example, during a non-codebook-based uplink transmission, for a terminal with non-coherent transmission capability, when an uplink precoding indication of the terminal corresponds to another precoding indication than the target precoding indication, the terminal scales the uplink transmission power determined according to the power control procedure, by the first ratio K1 between the number of antenna ports $Q_{used1}$ corresponding to the PUSCH with a non-zero power indicated by the other precoding indication and the number of antenna ports $Q_{configured1}$ corresponding to the uplink transmission mode of the terminal PUSCH configured by the network device for the terminal.

During a non-codebook-based uplink transmission, for a terminal with partial coherent transmission capability, when an uplink precoding indication of the terminal corresponds to another precoding indication than the target precoding indication indicating a transmission with a first number of streams, the terminal scales the uplink transmission power determined according to the power control procedure, by a first ratio K1 between the number of antenna ports $Q_{used1}$ of the PUSCH with a non-zero power indicated by the other precoding indication and the number of antenna ports $Q_{configured1}$ corresponding to the uplink transmission mode of the terminal PUSCH that is configured by the network device for the terminal.

The first stream number may be a single stream or multiple streams, such as 2 streams, 3 streams, 4 streams, and so on.

In a second manner, according to some embodiments of the present disclosure, in step 103 or 104, a step of scaling the uplink transmission power determined according to the power control procedure, according to the number of antenna ports configured by the network device for the terminal includes following steps:

step 1053: obtaining a second ratio between the maximum number of antenna ports capable of being transmitted coherently that is supported by the terminal and the number of antenna ports corresponding to an uplink transmission mode of the physical uplink shared channel (PUSCH) of the terminal configured by the network device for the terminal.

It is assumed that the maximum number of antenna ports that is capable of performing coherent transmission and supported by the terminal is denoted as $Q_{max}$, and the number of antenna ports corresponding to the uplink transmission mode of the terminal PUSCH configured by the network device for the terminal is denoted as $Q_{configured1}$, the second ratio K2 is obtained: $K2=Q_{max}/Q_{configured1}$.

Step 1054: scaling, according to the second ratio, the uplink transmission power determined according to the power control procedure.

The uplink transmission power determined according to the power control procedure is scaled according to the second ratio K2, which reduces the implementation cost of the terminal.

For example, during a non-codebook-based uplink transmission, for a terminal with partial coherent transmission capability, when an uplink precoding indication of the terminal corresponds to another precoding indication than the target precoding indication that indicates a single-stream transmission, the terminal scales the uplink transmission power determined according to the power control procedure, by the second ratio K2 between the maximum number of antenna ports $Q_{max}$ that is capable of performing coherent transmission and supported by the terminal and the number of antenna ports $Q_{configured1}$ corresponding to the uplink transmission mode of the terminal PUSCH configured by the network device for the terminal.

In this case, during a non-codebook-based uplink transmission, for a terminal with partial coherent transmission capability, when an uplink precoding indication of the terminal corresponds to another precoding indication indicating a multi-stream (such as 2-stream, 3-stream, or 4-stream) transmission than the target precoding indication, the terminal may scale, in the first manner, the uplink transmission power determined according to the power control procedure, by the first ratio K1 between the number of antenna ports $Q_{used1}$ corresponding to the PUSCH with a non-zero power indicated by the other precoding indication and the number of antenna ports $Q_{configured1}$ corresponding to the uplink transmission mode of the terminal PUSCH configured by the network device for the terminal.

Of course, based on non-codebook-based uplink transmission, for a terminal with partial coherent transmission capability, when an uplink precoding indication of the terminal corresponds to another precoding indication indicating a multi-stream (such as 2-stream, 3-stream, or 4-stream) transmission than the target precoding indication, the terminal may scale a power in the second manner.

Optionally, during a non-codebook-based uplink transmission, for a terminal with partial coherent transmission capability, when an uplink precoding indication of the terminal corresponds to a precoding indication of single-stream transmission, the terminal scales the uplink transmission power determined according to the power control procedure, by the second ratio K2 between the maximum number of antenna ports $Q_{max}$ that is capable of performing coherent transmission and supported by the terminal and the number of antenna ports $Q_{configured1}$ corresponding to the uplink transmission mode of the terminal PUSCH configured by the network device for the terminal.

In this case, during a non-codebook-based uplink transmission, for a terminal with partial coherent transmission capability, when an uplink precoding indication of the terminal corresponds to the precoding indication for single-stream transmission, the terminal may scale the uplink transmission power determined according to the power control procedure according to the above second manner.

For terminals with a full coherent transmission capability, the maximum number of antenna ports where a coherent transmission can be supported is generally equal to the number of antenna ports corresponding to an uplink transmission mode of the terminal PUSCH configured by the network device for the terminal. Thus, when a terminal with a full coherent transmission capability performs power scaling according to the above second manner, the obtained scaling ratio is $K2=Q_{max}/Q_{configured1}=1$.

For terminals with a non-coherent transmission capability, the maximum number of antenna ports that can support a coherent transmission is generally 1. Therefore, when a terminal with a non-coherent transmission capability performs power scaling according to the above second manner, the obtained scaling ratio is $K2=Q_{max}/Q_{configured1}=1/Q_{configured1}$.

For terminals with a partial coherent transmission capability, the maximum number of antenna ports that can support a coherent transmission is generally 2. Therefore, when a terminal with a partial coherent transmission capability performs power scaling according to the above second manner, the obtained scaling ratio is $K2=Q_{max}/Q_{configured1}=2/Q_{configured1}$.

In the embodiments of the present disclosure, in non-codebook-based uplink transmissions, for a terminal with a full coherent transmission capability, the terminal may also control the value of the uplink transmission power determined according to the power control procedure to remain unchanged for any precoding indication.

In a third manner, according to some embodiments of the present disclosure, in step 103 or 104, a step of scaling the uplink transmission power determined according to the power control procedure, according to the number of uplink sounding reference signal (SRS) resources configured by the network device for the terminal includes:

step 1055: obtaining a third ratio of the number of SRS resources indicated by the SRS resource indication (SRI) to the number of SRS resources configured by the network device for the terminal and corresponding to an uplink transmission mode of the physical uplink shared channel (PUSCH) of the terminal.

It is supposed that the number of SRS resources indicated by the SRI is denoted as $Q_{used2}$, and the number of SRS resources corresponding to the uplink transmission mode of the terminal PUSCH configured by the network device for the terminal is denoted as $Q_{configured2}$, the third ratio K3 is obtained $K3=Q_{used2}/Q_{configured2}$.

Step 1056: scaling, according to the third ratio, the uplink transmission power determined according to the power control procedure.

The uplink transmission power determined according to the power control procedure is scaled by the third ratio K3, which reduces the implementation cost of the terminal.

The above third manner may be executed when each SRS resource includes one SRS port.

According to some embodiments of the present disclosure, the method further includes:

step 106: receiving codebook subset restriction information transmitted by a network device; and step 107: determining, according to the codebook subset restriction information, whether the uplink precoding indication corresponds to the target precoding indication.

During an uplink transmission based on the codebook, the network device may transmit the codebook subset restriction information to the terminal. Different pieces of codebook subset restriction information corresponds to different uplink codebooks. The terminal may determine whether the uplink precoding indication corresponds to the target precoding indication, according to the codebook subset restriction information.

According to some embodiments of the present disclosure, the codebook subset restriction information includes antenna coherent transmission information. For example, in a 3GPP NR system, the codebook subset restriction information includes a high-layer parameter of codebookSubset, candidate values of this parameter are {fullyAndPartialAndNonCoherent, partialAndNonCoherent, nonCoherent}, where fullyAndPartialAndNonCoherent corresponds to a codebook includes codewords under an assumption that antennas can perform full coherent transmission, partialAndNonCoherent corresponds to a codebook composed of codewords under an assumption that antennas can perform partial coherent transmission, and nonCoherent corresponds to a codebook composed of codewords under an assumption that all antennas cannot perform coherent transmission.

According to some embodiments of the present disclosure, all the above-mentioned methods in the embodiments of the present disclosure may be applicable to a scenario where only a certain value or several values corresponding to certain codebook subset restriction information is taken. For example, the method is only applicable to a scenario where the codebook subset restriction information codebookSubset transmitted by a network device to a terminal in a 3GPP NR system is configured as nonCoherent. For another example, the method is only applicable to a scenario where the codebook subset restriction information codebookSubset transmitted by a network device to a terminal in a 3GPP NR system is configured as nonCoherent or partialAndNonCoherent.

According to some embodiments of the present disclosure, when the codebook subset restriction information transmitted by the network device and received by the terminal has different values, the different values correspond to different target precoding indications.

According to some embodiments of the present disclosure, after the terminal controls the value of the uplink transmission power determined according to the power control procedure to remain unchanged, the terminal evenly distributes the uplink transmission power to antenna ports with non-zero data transmission to perform uplink signal transmission.

According to some embodiments of the present disclosure, after the terminal controls the value of the uplink transmission power determined according to the power control procedure to remain unchanged, the terminal equally split the uplink transmission power across antenna ports with non-zero data transmission to perform uplink signal transmission.

The antenna port with non-zero data transmission refers to an antenna port on which uplink signal data is mapped. As an example, an uplink transmission is PUSCH transmission.

Assuming that a precoding matrix corresponding to an precoding indication when a network device schedules a terminal to transmit PUSCH is ½ $[1\ 0\ 1\ 0]^T$, this precoding matrix is a target codeword (there are non-zero elements in this precoding matrix at a first port and a third port, i.e., there is non-zero data transmission), the PUSCH is a single-stream transmission, and data is mapped to the first antenna port and the third antenna port (the first antenna port and the third antenna port have the non-zero data transmission). The terminal evenly distributes the uplink transmission power determined according to the power control procedure to antenna ports with the non-zero data transmission, to perform PUSCH transmission.

Some possible implementation manners of the embodiments of the present disclosure are illustrated as follows:

Example 1 a network device configures N antenna ports for a terminal; in a case that the uplink precoding indication corresponds to the target precoding indication, a value of an uplink transmission power determined according to a power control procedure is controlled to remain unchanged; otherwise, the uplink transmission power determined according to the power control procedure is scaled by a ratio of antenna ports, where N is a positive integer.

When the target precoding indication is a transmission at rank 1, the precoding indication indicates only one antenna port with non-zero transmission.

In case of a codebook-based uplink transmission, when the target precoding indication is a transmission at rank 1, the precoding indication corresponds to a codeword with only one non-zero antenna port.

In case of a non-codebook-based uplink transmission, the target precoding indication is an SRI indicator indicating only one SRS resource.

Assuming that an uplink codebook is:

| TPMI index | W (ordered from left to right in increasing order of TPMI index) | | | | | | | |
|---|---|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | — | — |

In a case that the target precoding indication is a precoding indication where a serial number (index) in a DCI field corresponding to precoding information and the number of streams is 00, the target precoding indication corresponds to the codeword $$\frac{1}{\sqrt{2}}\begin{bmatrix}1\\0\end{bmatrix}.$$

According to some embodiments of the present disclosure, in order to reflect whether an uplink transmission corresponding to each codeword is scaled with respect to a ratio of antenna ports, a normalization factor of a codeword corresponding to the target precoding indication in the codebook can make a total power of the codeword is equal to 1, that is, the following codebook is used:

| TPMI index | W (ordered from left to right in increasing order of TPMI index) | | | | | | |
|---|---|---|---|---|---|---|---|
| 0-5 | $\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | — — |

In a case that the target precoding indication is a precoding indication where a serial number (index) in a DCI field corresponding to precoding information and the number of streams is 1, the target precoding indication corresponds to the codeword $$\frac{1}{\sqrt{2}}\begin{bmatrix}0\\1\end{bmatrix}.$$

In a case that the target precoding indication is a precoding indication where a serial number (index) in a DCI field corresponding to an SRS resource indication is 0, the target precoding indication corresponds to indicating only the first SRS resource.

In a case that a specific precoding indication may also be a precoding indication with a serial number (index) of 1 in a DCI field corresponding to an SRS resource indication, which is not repeated herein.

This example can be easily extended to 4 antenna ports, and will not be described again.

Example 2 in a case that the terminal is a terminal with a non-coherent transmission capability, or the terminal is a terminal with a partial coherent transmission capability, a target precoding matrix indication exists; otherwise, the target precoding indication does not exist.

In a case that the target precoding indication is indicated to the terminal by the network device, the target precoding matrix indication existing refers to that the network device indicates a target precoding indication for a terminal with non-coherent transmission capability or a terminal with partial coherent transmission capability; and the target precoding indication not existing refers to that the network device does not indicate a target precoding indication for a terminal with full coherent transmission capability.

Example 3: similar to Example 1, the difference is that the target precoding indication is all precoding indications for a certain target antenna port with non-zero transmission.

In case of codebook-based uplink transmission, the target precoding indication is a precoding indication corresponding to all codewords for a certain target antenna port with non-zero transmission.

In case of non-codebook-based uplink transmission, the target precoding indication is all SRI indications that include a certain target SRS resource.

Non-codebook-based uplink transmission is given as an example. Assuming that the target SRS resource is the first SRS resource (an index is 0), and the number of antenna ports configured by the network device is 4, if the SRI indication corresponds to Table 1 below, uplink transmission powers determined according to the power control procedure, which correspond to the SRI indication of all SRS resources with an index of 0, are not scaled with respect to a ratio of antenna ports.

TABLE 1

| Bit field mapped to index | SRI(s), $N_{SRS} = 4$ |
|---|---|
| 0 | 0 |
| 1 | 1 |
| 2 | 2 |
| 3 | 3 |
| 4 | 0,1 |
| 5 | 0,2 |
| 6 | 0,3 |
| 7 | 1,2 |
| 8 | 1,3 |
| 9 | 2,3 |
| 10 | 0,1,2 |
| 11 | 0,1,3 |
| 12 | 0,2,3 |
| 13 | 1,2,3 |
| 14 | 0,1,2,3 |
| 15 | reserving |

Example 4: similar to Example 1, the difference is that the target precoding indication includes: a precoding indication only containing a certain target antenna port with non-zero transmission at rank 1; and a precoding indication including both the above target antenna port with non-zero transmission and another target antenna port with non-zero transmission at rank 2.

Non-codebook-based uplink transmission is still taken as an example. The number of antenna ports configured by the network device is 4. If the SRI indication corresponds to Table 2 below, an example is that uplink transmission powers determined according to the power control procedure, which correspond to the SRI indication only containing the SRS resource with an index of 0 and the SRI indication including SRS resources with indexes of 0 and 1, are not scaled with respect to a ratio of antenna ports. Of course, there are other examples, for example, uplink transmission powers determined according to the power control procedure, which correspond to the SRI indication only containing the SRS resource with an index of 1 and the SRI indication including SRS resources with indexes of 1 and 3, are not scaled with respect to a ratio of antenna ports.

TABLE 2

| Bit field mapped to index | SRI(s), $N_{SRS} = 4$ |
|---|---|
| 0 | 0 |
| 1 | 1 |
| 2 | 2 |
| 3 | 3 |
| 4 | 0,1 |
| 5 | 0,2 |
| 6 | 0,3 |
| 7 | 1,2 |
| 8 | 1,3 |
| 9 | 2,3 |
| 10 | 0,1,2 |
| 11 | 0,1,3 |
| 12 | 0,2,3 |
| 13 | 1,2,3 |
| 14 | 0,1,2,3 |
| 15 | reserving |

Example 5: by taking non-codebook-based uplink transmission as an example, in a case that the terminal is a terminal with non-coherent transmission capability, the target precoding indication includes: a precoding indication only containing a certain target antenna port with non-zero transmission at rank 1; and a precoding indication including both the above target antenna port with non-zero transmission and another target antenna port at rank 2.

Example 6: by taking non-codebook-based uplink transmission as an example, in a case that the terminal is a terminal with partial coherent transmission capability, the target precoding indication is a precoding indication only containing a certain target antenna port with non-zero transmission at rank 1.

Example 7: by taking non-codebook-based uplink transmission as an example, in a case that the terminal is a terminal with full coherent transmission capability, the target precoding indication includes all precoding indications, that is, no matter what SRI indication is, no scaling is performed about a ratio of antenna ports.

Example 8: by taking non-codebook-based uplink transmission as an example, in a case that the terminal is a terminal with partial coherent transmission capability, when the number of configured antenna ports is 4, a corresponding scaling ratio about antenna ports is ½, if the rank number corresponding to a non-target precoding indication is 1.

Example 9: by taking non-codebook-based uplink transmission as an example, in a case that the terminal is a terminal with partial coherent transmission capability, when the number of configured antenna ports is 4, a corresponding scaling ratio about antenna ports is ½, if the rank number corresponding to a non-target precoding indication is 3.

In the uplink power control method according to the embodiments of the present disclosure, in a case that an uplink precoding indication corresponds to a target precoding indication, a value of an uplink transmission power determined according to a power control procedure is controlled to remain unchanged, which ensures that a maximum transmission power can be reached, when the precoding indication received by a terminal at a low signal-to-noise ratio is the target precoding indication, thereby improving the performance of uplink coverage. For example, when the terminal performs uplink MIMO transmissions at a low rank and not based on a codebook, an uplink transmission corresponding to the target precoding indication can reach a maximum uplink transmission power; when a terminal with non-coherent transmission capability or partial coherent transmission capability performs uplink MIMO transmissions based on a codebook, an uplink transmission corresponding to the target precoding indication can reach a maximum uplink transmission power; and it is not required that all antennas of the terminal can reach the maximum transmission power, thereby reducing the cost. In addition, as compared with that for all the uplink transmissions corresponding to precoding indications, an uplink transmission power determined according to a power control procedure is scaled (a scaling factor is less than 1) according to antenna ports, the uplink transmission power of the terminal can be higher in the embodiments when the precoding indication received by the terminal is a target precoding indication, thus better performance can be obtained.

Figure 2:
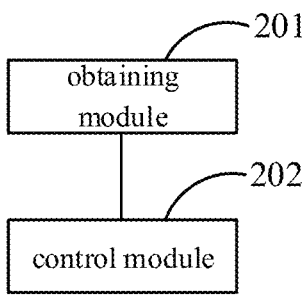
FIG. 2 is a schematic structural diagram of a terminal provided by an embodiment of the disclosure.

Based on the uplink power control method provided in the above embodiments, embodiments of the present disclosure further provide a terminal. Referring to FIG. 2, the terminal includes:

an obtaining module 201 configured to obtain an uplink precoding indication; and a control module 202 configured to control a value of an uplink transmission power determined according to a power control procedure to remain unchanged, in a case that the uplink precoding indication corresponds to a target precoding indication.

According to some embodiments of the present disclosure, the control module 202 is specifically configured to: not scale the uplink transmission power determined according to the power control procedure; or scale, according to a power scaling factor of 1, the uplink transmission power determined according to the power control procedure.

According to some embodiments of the present disclosure, the control module 202 is further configured to: in a case that the uplink precoding indication corresponds to a precoding indication other than the target precoding indication, scale the uplink transmission power determined according to the power control procedure, according to the number of antenna ports configured by a network device for the terminal or the number of uplink sounding reference signal (SRS) resources configured by a network device for the terminal.

According to some embodiments of the present disclosure, the control module 202 is further configured to: in a case that the uplink precoding indication corresponds to a transmission with a first number of streams and corresponds to a precoding indication other than the target precoding indication, scale the uplink transmission power determined according to the power control procedure, according to the number of antenna ports configured by a network device for the terminal or the number of uplink sounding reference signal (SRS) resources configured by a network device for the terminal.

According to some embodiments of the present disclosure, the target precoding indication comprises a transmission precoding matrix indicator (TPMI) corresponding to a target codeword and/or a transmission rank indication (TRI) corresponding to the target codeword.

According to some embodiments of the present disclosure, the target codeword includes a codeword that only has a non-zero value at a target antenna port.

According to some embodiments of the present disclosure, the target antenna port includes an antenna port with a smallest index.

According to some embodiments of the present disclosure, the target precoding indication includes an SRS resource indication (SRI) for indicating a target SRS resource.

According to some embodiments of the present disclosure, the target SRS resource includes an SRS resource with a smallest index.

According to some embodiments of the present disclosure, the target precoding indication includes a precoding indication for a single stream transmission.

According to some embodiments of the present disclosure, the target precoding indication is a pre-defined precoding indication; or the target precoding indication is obtained according to indication information of the target precoding indication transmitted by a network device, and the terminal further includes: a first receiving module, configured to receive the indication information of the target precoding indication transmitted by the network device, and obtain the target precoding indication according to the indication information.

According to some embodiments of the present disclosure, the terminal may further include: a fourth transmitting module configured to determine a mapping relationship between a physical antenna and an antenna port according to the target precoding indication; and transmit an uplink reference signal according to the mapping relationship.

According to some embodiments of the present disclosure, when scaling the uplink transmission power determined according to the power control procedure, according to the number of antenna ports configured by the network device for the terminal, the control module 202 may be configured to: obtain a first ratio of the number of antenna ports with a non-zero PUSCH transmission power over the number of antenna ports that corresponds to the uplink transmission mode of the PUSCH of the terminal and is configured by the network device for the terminal, according to the precoding indication and the number of antenna ports corresponding to the uplink transmission mode of the physical uplink shared channel (PUSCH) of the terminal configured by the network device for the terminal; and scale, according to the first ratio, the uplink transmission power determined according to the power control procedure.

According to some embodiments of the present disclosure, when scaling the uplink transmission power determined according to the power control procedure, according to the number of antenna ports configured by the network device for the terminal, the control module 202 may be configured to: obtain a second ratio of a maximum number of antenna ports capable of being transmitted coherently capable of being transmitted coherently that is supported by the terminal that is supported by the terminal, to the number of antenna ports configured by the network device for the terminal and corresponding to an uplink transmission mode of the physical uplink shared channel (PUSCH) of the terminal; and scale, according to the second ratio, the uplink transmission power determined according to the power control procedure.

According to some embodiments of the present disclosure, when scaling the uplink transmission power determined according to the power control procedure, according to the number of uplink sounding reference signal (SRS) resources configured by the network device for the terminal, the control module 202 may be configured to: obtain a third ratio between the number of SRS resources indicated by the SRS resource indication (SRI) and the number of SRS resources configured by the network device for the terminal and corresponding to an uplink transmission mode of the physical uplink shared channel (PUSCH) of the terminal; and scale, according to the third ratio, the uplink transmission power determined according to the power control procedure.

According to some embodiments of the present disclosure, the terminal further includes: a second receiving module configured to receive codebook subset restriction information transmitted by a network device; and determine, according to the codebook subset restriction information, whether the uplink precoding indication corresponds to the target precoding indication.

According to some embodiments of the present disclosure, different transmission modes correspond to different target precoding indications.

The above-mentioned terminal according to the embodiments of the present disclosure controls a value of an uplink transmission power determined according to a power control procedure to remain unchanged, in a case that an uplink precoding indication corresponds to a target precoding indication, which ensures that a maximum transmission power can be reached, when the precoding indication received by a terminal at a low signal-to-noise ratio is the target precoding indication, thereby improving the performance of uplink coverage. For example, when the terminal performs uplink MIMO transmissions at a low rank and not based on a codebook, an uplink transmission corresponding to the target precoding indication can reach a maximum uplink transmission power; when a terminal with non-coherent transmission capability or partial coherent transmission capability performs uplink MIMO transmissions based on a codebook, an uplink transmission corresponding to the target precoding indication can reach a maximum uplink transmission power; and it is not required that all antennas of the terminal can reach the maximum transmission power, thereby reducing the cost. In addition, as compared with that for all the uplink transmissions corresponding to precoding indications, an uplink transmission power determined according to a power control procedure is scaled (a scaling factor is less than 1) according to antenna ports, the uplink transmission power of the terminal can be higher in the embodiments when the precoding indication received by the terminal is a target precoding indication, thus better performance can be obtained.

It should be noted that all the implementation manners in the foregoing embodiments about the uplink power control method are applicable to embodiments of the terminal, and the same technical effect can also be achieved.

Figure 3:
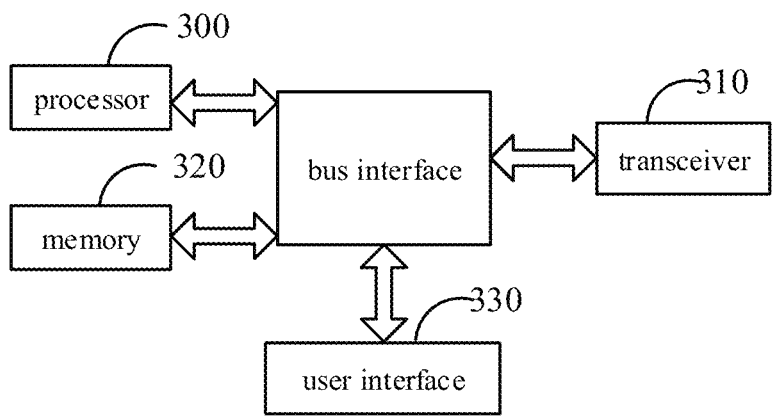
FIG. 3 is another schematic structural diagram of a terminal provided by an embodiment of the disclosure.

In some embodiments of the present disclosure, as shown in FIG. 3, a terminal is further provided, which includes a transceiver 310, a memory 320, a processor 300, a user interface 330, a bus interface, and a computer program stored on the memory 320 and executable on the processor 300.

The transceiver 310 is configured to obtain an uplink precoding indication.

The processor 300 is configured to read the program in the memory and execute the following processes: controlling a value of an uplink transmission power determined according to a power control procedure to remain unchanged, in a case that the uplink precoding indication corresponds to a target precoding indication.

In FIG. 3, the bus architecture may include any number of interconnected buses and bridges. Specifically, various circuits such as one or more processors represented by the processor 300 and a memory represented by the memory 320 are linked together. The bus architecture may also link various other circuits such as peripheral devices, voltage regulators, power management circuits, etc., which are all known in the art, and therefore, no further descriptions are provided herein. The bus interface provides an interface. The transceiver 310 may be a plurality of elements, including a transmitter and a receiver, and provides a unit for communicating with various other devices on a transmission medium. For different user equipment, the user interface 330 may also be an interface capable of connecting externally and internally with required equipment. The connected equipment includes but not limited to a keypad, a display, a speaker, a microphone, a joystick, etc.

The processor 300 is responsible for managing the bus architecture and general processing, and the memory 320 may store data used by the processor 300 when performing operations.

According to some embodiments of the present disclosure, the processor 300 is specifically configured to: not scale the uplink transmission power determined according to the power control procedure; or scale, by a power scaling factor of 1, the uplink transmission power determined according to the power control procedure.

According to some embodiments of the present disclosure, the processor 300 is further configured to: in a case that the uplink precoding indication corresponds to a precoding indication other than the target precoding indication, scale the uplink transmission power determined according to the power control procedure, according to the number of antenna ports configured by a network device for the terminal or the number of uplink sounding reference signal (SRS) resources configured by a network device for the terminal.

According to some embodiments of the present disclosure, the processor 300 is further configured to: in a case that the uplink precoding indication corresponds to a transmission with a first number of streams and corresponds to a precoding indication other than the target precoding indication, scaling the uplink transmission power determined according to the power control procedure, according to the number of antenna ports configured by a network device for the terminal or the number of uplink sounding reference signal (SRS) resources configured by a network device for the terminal.

According to some embodiments of the present disclosure, the target precoding indication comprises a transmission precoding matrix indicator (TPMI) corresponding to a target codeword and/or a transmission rank indication (TRI) corresponding to the target codeword.

According to some embodiments of the present disclosure, the target codeword includes a codeword that only has a non-zero value at a target antenna port.

According to some embodiments of the present disclosure, the target antenna port includes an antenna port with a smallest index.

According to some embodiments of the present disclosure, the target precoding indication includes an SRS resource indication (SRI) for indicating a target SRS resource.

According to some embodiments of the present disclosure, the target SRS resource includes the SRS resource with a smallest index.

According to some embodiments of the present disclosure, the target precoding indication includes a precoding indication for a single stream transmission.

According to some embodiments of the present disclosure, the target precoding indication is a pre-defined precoding indication; or the target precoding indication is obtained according to indication information of the target precoding indication transmitted by a network device, and the transceiver 310 is further configured to receive the indication information of the target precoding indication transmitted by the network device, the processor 300 is configured to obtain the target precoding indication according to the indication information.

According to some embodiments of the present disclosure, the processor 300 may be further configured to determine a mapping relationship between a physical antenna and an antenna port according to the target precoding indication; and transmit an uplink reference signal according to the mapping relationship.

According to some embodiments of the present disclosure, when scaling the uplink transmission power determined according to the power control procedure, according to the number of antenna ports configured by the network device for the terminal, the processor 300 may be configured to: obtain a first ratio of the number of antenna ports with a non-zero PUSCH transmission power over the number of antenna ports that corresponds to the uplink transmission mode of the PUSCH of the terminal and is configured by the network device for the terminal, according to the precoding indication and the number of antenna ports corresponding to the uplink transmission mode of the physical uplink shared channel (PUSCH) of the terminal configured by the network device for the terminal; and scale, according to the first ratio, the uplink transmission power determined according to the power control procedure.

According to some embodiments of the present disclosure, when scaling the uplink transmission power determined according to the power control procedure, according to the number of antenna ports configured by the network device for the terminal, the processor 300 may be configured to: obtain a second ratio between the maximum number of antenna ports that is capable of performing coherent transmission and supported by the terminal and the number of antenna ports configured by the network device for the terminal and corresponding to an uplink transmission mode of the physical uplink shared channel (PUSCH) of the terminal; and scale, according to the second ratio, the uplink transmission power determined according to the power control procedure.

According to some embodiments of the present disclosure, when scaling the uplink transmission power determined according to the power control procedure, according to the number of uplink sounding reference signal (SRS) resources configured by the network device for the terminal, the processor 300 may be configured to: obtain a third ratio between the number of SRS resources indicated by the SRS resource indication (SRI) and the number of SRS resources configured by the network device for the terminal and corresponding to an uplink transmission mode of the physical uplink shared channel (PUSCH) of the terminal; and scale, according to the third ratio, the uplink transmission power determined according to the power control procedure.

According to some embodiments of the present disclosure, the transceiver 310 is further configured to: receive codebook subset restriction information transmitted by a network device; and determine, according to the codebook subset restriction information, whether the uplink precoding indication corresponds to the target precoding indication.

According to some embodiments of the present disclosure, different transmission modes correspond to different target precoding indications.

In some embodiments of the present disclosure, a computer-readable storage medium is further provided, on which a computer program is stored. The program is executed by a processor to implement steps of the above-mentioned uplink power control method at the terminal side.

Figure 4:
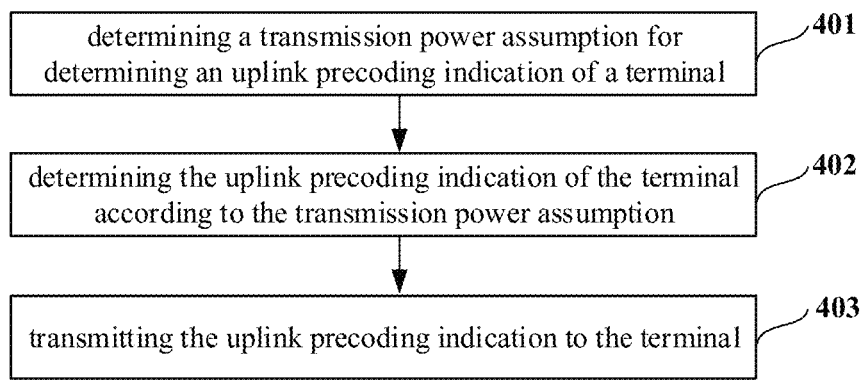
FIG. 4 is a flowchart of an uplink power control method provided by an embodiment of the disclosure.

In some embodiments of the present disclosure, referring to FIG. 4, an uplink power control method is provided, which is applied to a network device. The method includes:

step 401: determining a transmission power assumption for determining an uplink precoding indication of a terminal;

step 402: determining the uplink precoding indication of the terminal according to the transmission power assumption; and step 403: transmitting the uplink precoding indication to the terminal.

In the uplink power control method according to the embodiments of the present disclosure, the network device determines the transmission power assumption used to determine the uplink precoding indication of the terminal, and transmits the uplink precoding indication to the terminal. In such manner, when the uplink precoding indication corresponds to the target precoding indication, the terminal controls the value of the uplink transmission power determined according to the power control procedure to remain unchanged, which ensures that a maximum transmission power can be reached under some of precoding indications, thereby improving performance. For example, when the terminal performs uplink MIMO transmissions at a low rank and not based on a codebook, some of pre-codings can reach the maximum uplink transmission power; and when a terminal with non-coherent transmission capability or partial coherent transmission capability performs uplink MIMO transmissions at a low rank and based on a codebook, part of pre-codings can reach the maximum uplink transmission power; and it is not required that all antennas of the terminal can reach the maximum transmission power, thereby reducing the cost.

The network device may determine uplink scheduling information, such as channel state information (Channel State Information, CSI), TPMI, TRI, and modulation and coding scheme (Modulation and Coding Scheme, MCS), according to the transmission power assumption for determining the uplink precoding indication of the terminal.

According to some embodiments of the present disclosure, for target precoding corresponding to the target precoding indication, the network device calculates a channel quality indicator (Channel Quality Indicator, CQI) according to a normalized power of 1; and for precoding corresponding to other precoding indications, the network device performs CQI calculation according to a power after being scaled (scaling) according to a normalized power. For example, in the case of codebook-based uplink transmission, if a codeword corresponding to the target precoding indication is $$\frac{1}{\sqrt{2}}\begin{bmatrix}1\\0\end{bmatrix},$$

the network device calculates a CQI according to an actual codeword $$\begin{bmatrix}1\\0\end{bmatrix}$$

of the target precoding indication. That is, the network device calculates the CQI by assuming that the actual transmission power corresponding to the codeword $$\frac{1}{\sqrt{2}}\begin{bmatrix}1\\0\end{bmatrix}$$

is twice of the transmission power of the codeword $$\frac{1}{\sqrt{2}}\begin{bmatrix}1\\0\end{bmatrix}.$$

For example, in the case of non-codebook-based uplink transmission, if 4 SRS resources are configured, the target precoding indication corresponds to SRI=0, for an SRS resource corresponding to SRI=0, the network device calculate the CQI according to a precoding normalized power of 1; and for other SRIs, the network device calculates the CQI according to the normalized power after being scaled. For example, if SRI=1, the CQI is calculated according to the normalized power corresponding precoding, which is ¼; and if SRI=1, 2, the CQI is calculated according to the normalized total power corresponding precoding, which is ½.

In the embodiments, the calculating the CQI for a precoding according to a normalized power of 1 means that the network device assumes that the precoding indication information received by the terminal corresponds to this precoding, and the terminal controls the value of the uplink transmission power determined according to the power control procedure to remain unchanged, and calculates the CQI under this assumption. The calculating the CQI for a precoding according to a normalized power subjected to being scaled means that the network device assumes that the precoding indication information received by the terminal corresponds to this precoding, and the terminal scales, by a ratio, the value of the uplink transmission power determined according to the power control procedure, and calculates the CQI under this assumption. Optionally, the terminal controlling the value of the uplink transmission power determined according to the power control procedure to remain unchanged specifically includes: scaling the uplink transmission power determined according to the power control procedure, by the terminal using a scaling factor of 1. Optionally, the terminal controlling the value of the uplink transmission power determined according to the power control procedure to remain unchanged specifically includes that the terminal does not scale the uplink transmission power determined according to the power control procedure.

The target precoding mentioned in the embodiments of the present disclosure includes a first target precoding, a second precoding, and a third target precoding.

According to some embodiments of the present disclosure, the target precoding is a pre-defined precoding; or the precoding is configured by the network device.

According to some embodiments of the present disclosure, the target precoding indication may be pre-defined in a direct manner or an indirect manner.

For example, a direct pre-defined manner is: pre-defining a precoding to be a target precoding when an index (sequence number) is equal to 0. Another direct pre-defined manner is: pre-defining a precoding to be a target precoding when an index corresponds to a certain value or some values.

Some indirect manners are included:

one way is to pre-define that when a value of a precoding corresponds to some pre-defined values, the network device determines a corresponding transmission power assumption to be: that the terminal does not scale the uplink transmission power determined according to the power control procedure, according to a ratio of antenna ports;

one way is to pre-define that when a value of a precoding corresponds to some pre-defined values, the network device determines a corresponding transmission power assumption to be: that the terminal scales the uplink transmission power determined according to the power control procedure, by a scaling factor of 1 for antenna ports;

one way is to pre-define that when a value of a precoding corresponds to some pre-defined values, a transmission power that is determined according to the power control procedure and is further scaled by a ratio by the terminal is equal to the uplink transmission power determined according to the power control procedure; and one way is to set normalized powers of some codewords that only use some antenna ports in a codebook to 1. The precodings corresponding to these codewords may be considered to correspond to the target precoding.

Notably, there may also be some other methods not listed, which shall fall within the scope of the present disclosure.

According to some embodiments of the present disclosure, the network device transmits indication information of the target precoding indication to the terminal through RRC signaling.

According to some embodiments of the present disclosure, the target precoding is a precoding corresponding to the target codeword, and a target precoding indication corresponding to the target precoding includes transmit precoding matrix indicator (Transmit Precoding Matrix Indicator, TPMI) corresponding to the target codeword and/or transmit rank indication (Transmit Rank Indication, TRI) corresponding to the target codeword.

For example, when an uplink transmission scheme is a codebook-based uplink transmission, the precoding indication is indicated by a field of precoding information and the number of streams (Precoding information and number of layers) in DCI (Downlink Control Information), and the precoding indication includes TPMI and TRI corresponding to an uplink transmission corresponding to the precoding. The target precoding indication is a value of Precoding information and number of layers corresponding to the target codeword.

The number of the target precodings may be one or multiple.

According to some embodiments of the present disclosure, all the target precodings are precodings corresponding to codewords for single-stream transmissions.

According to some embodiments of the present disclosure, some of the target precodings correspond to one or more codewords for single-stream transmission, and some other precodings correspond to one or more codewords for multi-stream transmission.

According to some embodiments of the present disclosure, the target precoding includes a precoding corresponding to the target codeword.

According to some embodiments of the present disclosure, the target codeword is a pre-defined codeword; or the target codeword is configured by the network device.

According to some embodiments of the present disclosure, the target codeword includes a codeword that has a non-zero value only at the target antenna port.

In this case, the target precoding includes a precoding corresponding to a codeword having a non-zero value only at the target antenna port, and the target precoding indication includes a precoding indication corresponding to the codeword having a non-zero value only at the target antenna port.

According to some embodiments of the present disclosure, the target precoding includes a precoding corresponding to the codeword having a non-zero value only at the target antenna port.

According to some embodiments of the present disclosure, the target precoding indication includes all precoding indications corresponding to all codewords that have non-zero values only on the target antenna port.

For example, the target precoding includes a precoding corresponding to a codeword having a non-zero value only on the first antenna port (in ascending order of indexes) in a codebook when a network device configures two antenna ports for a terminal, and the target precoding indication includes a TPMI corresponding to the codeword with a non-zero value only on the first antenna port in the codebook when the network device configures two antenna ports for the terminal. For another example, the target precoding includes a precoding corresponding to a codeword with a non-zero value only on the second antenna port (in ascending order of indexes) in a codebook when a network device configures four antenna ports for a terminal, and the target precoding indication includes a TPMI corresponding to the codeword with a non-zero value only on the second antenna port in the codebook when the network device configures four antenna ports for the terminal, but they are not limited thereto.

According to some embodiments of the present disclosure, the aforementioned target antenna port is a pre-defined antenna port; or the target antenna port is a target antenna port configured by the network device.

According to some embodiments of the present disclosure, the target antenna port includes an antenna port with a smallest sequence number.

According to some embodiments of the present disclosure, the target antenna port is an antenna port with a smallest sequence number.

In these embodiments, the target precoding is a precoding corresponding to a codeword with a non-zero value only on the antenna port with the smallest sequence number, and the target precoding indication is a precoding indication corresponding to a codeword with a non-zero value only on the antenna port with the smallest sequence number.

According to some embodiments of the present disclosure, the target precoding includes a precoding corresponding to a target SRS resource; and the target precoding indication includes an SRS resource indication for indicating the target SRS resource.

For example, during an uplink transmission not based on a codebook, the precoding indication is SRI (SRS resource indicator), which may be obtained through an "SRS resource indicator" field in a DCI, and the SRI indicates an SRS resource corresponding to a PUSCH transmission. The terminal may also obtain the number of streams of the uplink transmission according to the SRI.

According to some embodiments of the present disclosure, the target precoding includes a precoding corresponding to the first SRS resource (arranged in ascending order of indexes configured for SRS resources). For another example, the target precoding includes a precoding corresponding to the first two SRS resources (arranged in ascending order of indexes configured for SRS resources).

According to some embodiments of the present disclosure, the target SRS resource is an SRS resource with a smallest index.

At this time, the target precoding includes the precoding corresponding to the SRS resource with the smallest index, and the target precoding indication includes an SRI indicating the SRS resource with the smallest index.

According to some embodiments of the present disclosure, the target SRS resource is an SRS resource with the smallest index.

According to some embodiments of the present disclosure, the target precoding may be one or more precodings corresponding to the target SRS resource.

According to some embodiments of the present disclosure, the target precoding is all precodings corresponding to the target SRS resource.

According to some embodiments of the present disclosure, the target precoding indication includes a precoding indication for single-stream transmission.

According to some embodiments of the present disclosure, in case of single-stream transmission, the target precoding is a precoding corresponding to a codeword with a non-zero value only on the antenna port with the smallest index.

According to some embodiments of the present disclosure, the above step 401 includes:

step 4011: determining an assumed coherent transmission capability of the terminal and an uplink transmission mode; and step 4012: determining, according to the assumed coherent transmission capability of the terminal and/or the uplink transmission mode, the transmission power assumption for determining the uplink precoding indication of the terminal.

In this case, the network device determines the transmission power assumption for determining the uplink precoding indication of the terminal, according to the assumed coherent transmission capability of the terminal and/or the uplink transmission mode, so as to determine the uplink scheduling information according to the transmission power assumption for determining the uplink precoding indication of the terminal.

According to some embodiments of the present disclosure, the assumed coherent transmission capability of the terminal is a coherent transmission capability of the terminal obtained according to a coherent transmission capability report of the terminal; or the assumed coherent transmission capability of the terminal is a coherent transmission capability corresponding to a codebook subset restriction configured for the terminal.

Different uplink transmission modes may correspond to different assumed coherent transmission capabilities of the terminal.

For example, in non-codebook-based uplink transmission, the assumed coherent transmission capability of the terminal may be obtained according to a terminal coherent transmission capability report; in codebook-based transmission mode, the assumed coherent transmission capability of the terminal is a coherent transmission capability corresponding to a codebook subset restriction configured for the terminal. Two assumed coherent transmission capabilities of the terminal may be the same or different.

According to some embodiments of the present disclosure, the assumed coherent transmission capability of the terminal is obtained according to the terminal coherent transmission capability report, and the assumed coherent transmission capability of the terminal is a coherent transmission capability reported by the terminal. That is, if the coherent transmission capability reported by the terminal is a non-coherent transmission capability, the assumed coherent transmission capability of the terminal is the non-coherent transmission capability; if the coherent transmission capability reported by the terminal is a partial coherent transmission capability, the assumed coherent transmission capability of the terminal is a partial coherent transmission capability; and if the coherent transmission capability reported by the terminal is a full coherent transmission capability, then the assumed coherent transmission capability of the terminal is a full coherent transmission capability.

According to some embodiments of the present disclosure, the assumed coherent transmission capability of the terminal is a coherent transmission capability corresponding to a codebook subset restriction configured for the terminal by the network device. For example, if codebook subset restriction information configured by the network device for the terminal corresponds to non-coherent transmission, the assumed coherent transmission capability of the terminal is a non-coherent transmission capability (for example, in a 3GPP NR system, if a high-layer parameter of codebookSubset in the codebook subset restriction indication information of the terminal is to be configured or has been configured to be nonCoherent, the coherent transmission capability of the terminal assumed by the network device is the non-coherent transmission capability). For example, if codebook subset restriction information configured by the network device for the terminal corresponds to partial coherent transmission, the assumed coherent transmission capability of the terminal is a partial coherent transmission capability (for example, in a 3GPP NR system, if a high-layer parameter of codebookSubset in the codebook subset restriction indication information of the terminal is to be configured or has been configured to be partialAndNonCoherent, the coherent transmission capability of the terminal assumed by the network device is a partial coherent transmission capability). For example, if codebook subset restriction information configured by the network device for the terminal corresponds to full coherent transmission, the assumed coherent transmission capability of the terminal is full coherent transmission capability (for example, in a 3GPP NR system, if a high-layer parameter of codebookSubset in the codebook subset restriction indication information of the terminal is to be configured or has been configured to be fullyAndPartialAndNonCoherent, the coherent transmission capability of the terminal assumed by the network device is a full coherent transmission capability).

According to some embodiments of the present disclosure, the above step 4012 includes step 40121: in a case that a first target precoding exists in the uplink transmission mode, determining a transmission power assumption corresponding to the first target precoding to be that the terminal controls a value of an uplink transmission power determined according to a power control procedure to remain unchanged.

In this case, when a first target precoding exists in the uplink transmission mode, the network device determines the transmission power assumption corresponding to the first target precoding to be: that the terminal controls a value of an uplink transmission power determined according to a power control procedure to remain unchanged. That is, a scaling factor for a normalized power of the first target precoding is 1, or no scaling is performed.

When receiving an uplink precoding indication that corresponds to the first target precoding, the terminal controls the value of the uplink transmission power determined according to the power control procedure to remain unchanged.

According to some embodiments of the present disclosure, the above step 4012 includes step 40122: determining a transmission power assumption corresponding to a precoding other than the first target precoding to be: that the terminal scales the uplink transmission power determined according to the power control procedure, according to the number of antenna ports configured by a network device for the terminal or the number of uplink sounding reference signal (SRS) resources configured by a network device for the terminal.

In this case, when the first target precoding exists in the uplink transmission mode, the network device determines the transmission power assumption corresponding to a precoding other than the first target precoding to be: that the terminal scales the uplink transmission power determined according to the power control procedure, according to the number of antenna ports configured for the terminal or the number of uplink sounding reference signal (SRS) resources configured for the terminal.

According to some embodiments of the present disclosure, a step of determining the transmission power assumption corresponding to a percoding other than the first target precoding to be that the terminal scales an uplink transmission power determined according to a power control procedure, according to the number of antenna ports configured for the terminal or the number of uplink sounding reference signal (SRS) resources configured for the terminal includes: determining the transmission power assumption corresponding to a percoding other than the first target precoding to be: that the terminal scales, by using a scaling factor less than 1, the uplink transmission power determined according to the power control procedure, according to the number of antenna ports configured for the terminal or the number of uplink sounding reference signal (SRS) resources configured for the terminal.

When receiving an uplink precoding indication corresponding to the precoding indication other than the precoding indication of the first target precoding, the terminal scales the uplink transmission power determined according to the power control procedure, according to the uplink precoding indication, and the number of antenna ports configured by the network device for the terminal or the number of uplink sounding reference signal (SRS) resources configured by the network device for the terminal.

For example, in the 3GPP NR systems, when a target precoding for a codebook-based uplink transmission is a precoding corresponding to a codeword with a non-zero value only on an antenna port with a smallest index in single-stream transmission, and accordingly, a codeword corresponding to a precoding without scaling an uplink transmission power determined in a power control procedure according to a ratio of antenna ports is:

$$\frac{1}{\sqrt{2}}\begin{bmatrix}1\\0\end{bmatrix},$$

when the number of antenna ports configured for the terminal is 2; and $$\frac{1}{2}\begin{bmatrix}1\\0\\0\\0\end{bmatrix},$$

when the number of antenna ports configured for the terminal is 4.

For example, it is supposed that the target precoding is a precoding corresponding to a codeword with a non-zero value only on an antenna port with a smallest index in single-stream transmission, and the target precoding indication is a precoding indication corresponding to a codeword with a non-zero value only on an antenna port with a smallest index in single-stream transmission. The network device determines a precoding corresponding to a codeword $$\frac{1}{\sqrt{2}}\begin{bmatrix}1\\0\end{bmatrix}$$

to belong to the first target precoding, and determines a corresponding transmission power assumption to be that the terminal controls the value of the uplink transmission power determined according to the power control procedure to remain unchanged. In a case that an uplink precoding indication received by a terminal indicates a codeword $$\frac{1}{\sqrt{2}}\begin{bmatrix}1\\0\end{bmatrix},$$

that is, the number of antenna ports configured for a PUSCH is 2, a value corresponding to one antenna port in the codeword is non-zero, and a value corresponding to the other antenna port is 0, according to the existing methods, a total transmission power of the PUSCH corresponding to the codeword is ½ of the uplink transmission power determined according to a power control procedure. According to the embodiments of the present disclosure, the total transmission power of the PUSCH corresponding to the codeword is equal to a value of the uplink transmission power determined according to the power control procedure, and is maintained. That is, the uplink transmission power determined according to the power control procedure is not scaled, or the uplink transmission power determined according to the power control procedure is scaled according to a power scaling factor of 1.

For example, assuming that the target precoding indication is a precoding indication corresponding to a codeword with a non-zero value only on an antenna port with a smallest index in single-stream transmission. The network device determines a precoding corresponding to a codeword $$\frac{1}{2}\begin{bmatrix}1\\0\\0\\0\end{bmatrix}$$

to belong to the first target precoding, and determines a corresponding transmission power assumption to be that the terminal controls the value of the uplink transmission power determined according to the power control procedure to remain unchanged. In a case that a codeword of an uplink precoding indication received by a terminal is $$\frac{1}{2}\begin{bmatrix}1\\0\\0\\0\end{bmatrix},$$

that is, the number of antenna ports configured for a PUSCH is 4, a value corresponding to one antenna port in the codeword is non-zero, and values corresponding to other antenna ports are 0, according to the existing methods, a total transmission power of the PUSCH corresponding to the codeword is ¼ of the uplink transmission power determined according to a power control procedure. According to the embodiments of the present disclosure, this uplink precoding indication corresponds to the target precoding indication, and the total transmission power of the PUSCH corresponding to the codeword is equal to a value of the uplink transmission power determined according to the power control procedure, and is unchanged. That is, the uplink transmission power determined according to the power control procedure is not scaled, or the uplink transmission power determined according to the power control procedure is scaled according to a power scaling factor of 1.

According to some embodiments of the present disclosure, in a case that an uplink transmission is based on a codebook, a normalization factor of a codeword corresponding to the target precoding indication is to enable a normalized power of the codeword to be 1. The normalized power of the codeword refers to the sum of powers of all positions in the codeword, that is, a square of values of all positions in the codeword. For example, a normalized power of a codeword $$\frac{1}{\sqrt{2}}\begin{bmatrix}0\\1\end{bmatrix}$$

is ½, and a normalized power of a codeword $$\begin{bmatrix}1\\0\end{bmatrix}$$

is 1.

In a case that an uplink transmission is not based on a codebook, when the target precoding is a precoding corresponding to an SRS resource with a smallest index, for example, the target precoding is a precoding corresponding to the first SRS resource (arranged in ascending order of indexes), the network device determines that the precoding corresponding to the first SRS resource belongs to the first target precoding, and determines a corresponding transmission power assumption to be that the terminal controls the value of the uplink transmission power determined according to the power control procedure to remain unchanged. A terminal receives an SRI only indicating the first SRS, according to embodiments of the present disclosure, this uplink precoding indication SRI corresponds to the target precoding indication, and the total transmission power of the corresponding PUSCH is equal to a value of the uplink transmission power determined according to the power control procedure, and keeps unchanged. That is, the uplink transmission power determined according to the power control procedure is not scaled, or the uplink transmission power determined according to the power control procedure is scaled according to a power scaling factor of 1.

If a certain precoding does not only correspond to the first SRS resource or does not correspond to the first SRS resource (for example, the target precoding corresponds to the first SRS resource and the second SRS resource, for another example, the target precoding corresponds to the third SRS resource, and so on), the network device determines a transmission power assumption corresponding to the precoding in the uplink transmission mode to be that the terminal scales an uplink transmission power determined according to a power control procedure. If an SRI indicated by the network device and received by the terminal does not only correspond to the first SRS resource or does not correspond to the first SRS resource (for example, the SRI corresponds to the first SRS resource and the second SRS resource, for another example, the SRI corresponds to the third SRS resource, and so on), a total uplink transmission power of the corresponding PUSCH determined by the terminal may be an uplink transmission power that is determined according to the power control procedure, and is further scaled.

According to some embodiments of the present disclosure, the methods in the embodiments of the present disclosure may only be applicable to certain specific types of terminals. For example, it is only applicable to terminals with non-coherent transmission capabilities. For another example, it is only applicable to terminals with non-coherent transmission capabilities or partial coherent transmission capabilities.

According to some embodiments of the present disclosure, the method in the embodiments of the present disclosure may be applicable to certain types of terminals in a transmission mode, and applicable to other types of terminals in another transmission mode. For example, in a codebook based transmission mode, the method is applicable to terminals with coherent transmission capabilities or partial coherent transmission capabilities, and in a non-codebook based transmission mode, the method is applicable to all terminals.

According to some embodiments of the present disclosure, terminals with different coherent transmission capabilities may correspond to different target precoding indications.

According to some embodiments of the present disclosure, a same terminal may correspond to different target precoding indications in different transmission modes.

As an embodiment, under the configuration of N antenna ports, the number of the target precodings may be multiple. For example, the number of the target precodings in a non-codebook-based transmission mode may be 2, and the target precoding is an precoding corresponding to only the first SRS resource (arranged in ascending order of sequence numbers), and an precoding corresponding to the first and second SRS antenna resources. That is, when the SRS resource corresponding to the precoding is the first SRS resource or the SRS resource corresponding to the precoding is the first and second SRS resources, the network device determines a transmission power assumption corresponding to the precoding in the uplink transmission mode to be that the terminal controls an uplink transmission power determined according to a power control procedure to remain unchanged, and does not scale the power with respect to a ratio of antenna ports. When an SRS resource corresponding to the precoding is other SRS resource, for example, the precoding corresponding to the second SRS resource or other SRS resource, the network device determines a transmission power assumption corresponding to the precoding in the uplink transmission mode to be that the terminal scales an uplink transmission power determined according to a power control procedure, by a ratio of antenna ports.

According to some embodiments of the present disclosure, the above step 4012 includes step 40123 and/or step 40124.

Step 40123 includes: determining a transmission power assumption corresponding to a second target precoding in the uplink transmission mode to be that the terminal controls a value of an uplink transmission power determined according to a power control procedure to remain unchanged, in a case that the assumed coherent transmission capability of the terminal is non-coherent transmission.

At this time, in a case that the assumed coherent transmission capability of the terminal is non-coherent transmission, the network device determines that a transmission power assumption corresponding to a second target precoding in the uplink transmission mode to be that the terminal controls a value of an uplink transmission power determined according to a power control procedure to remain unchanged, that is, a scaling factor of a normalized power of the second target precoding is 1, or no scaling is performed. When the terminal with non-coherent transmission capability receives the uplink precoding indication corresponding to the second target precoding indication, the terminal controls the value of the uplink transmission power determined according to the power control procedure to remain unchanged.

Step 40124 includes: determining a transmission power assumption corresponding to a third target precoding in the uplink transmission mode to be that the terminal controls a value of an uplink transmission power determined according to a power control procedure to remain unchanged, in a case that the assumed coherent transmission capability of the terminal is partial coherent transmission.

At this time, if the assumed coherent transmission capability of the terminal is partial coherent transmission, a transmission power assumption corresponding to a third target precoding in the uplink transmission mode is determined that the terminal controls a value of an uplink transmission power determined according to a power control procedure to remain unchanged, that is, a scaling factor of a normalized power of the third target precoding is 1, or no scaling is performed. When the terminal with non-coherent transmission capability receives the uplink precoding indication corresponding to the third target precoding indication, the terminal controls the value of the uplink transmission power determined according to the power control procedure to remain unchanged.

Different uplink transmission modes may correspond to different second target precodings and/or third target precodings.

According to some embodiments of the present disclosure, the uplink transmission mode is non-codebook-based uplink transmission, the assumed coherent transmission capability of the terminal is non-coherent transmission, and the above step 4012 further includes step 40125: determining a transmission power assumption corresponding to another precoding than the second target precoding to be: that the terminal scales, according to a first ratio, the uplink transmission power determined according to the power control procedure, where the first ratio is a ratio of the number of antenna ports with a non-zero PUSCH transmission power corresponding to the other precoding over the number of antenna ports that corresponds to the uplink transmission mode of the PUSCH of the terminal and is configured by the network device for the terminal.

It is assumed that the number of antenna ports corresponding to the PUSCH with a non-zero power corresponding to the other precoding is denoted as $Q_{used1}$, the number of antenna ports corresponding to the uplink transmission mode of the terminal PUSCH configured by the network device for the terminal is denoted as $Q_{configured1}$, the first ratio K1 is obtained $K1=Q_{used1}/Q_{configured1}$. For non-codebook-based uplink transmission, if the assumed coherent transmission capability of the terminal is non-coherent transmission, the network device determines the transmission power assumption corresponding to the other precoding than the second target precoding is that the terminal scales the uplink transmission power determined by the power control procedure, according to the first ratio K1. When receiving the uplink precoding indication corresponding to the other precoding indication except the second target precoding indication, the terminal scales the uplink transmission power determined according to the power control procedure according to the first ratio K1.

According to some embodiments of the present disclosure, the uplink transmission mode is non-codebook-based uplink transmission, the assumed coherent transmission capability of the assumed terminal is partial coherent transmission, and the above step 4012 further includes: determining a transmission power assumption corresponding to a precoding of a first stream number other than the third target precoding to be: that the terminal scales, according to a first ratio, the uplink transmission power determined according to the power control procedure, where the first ratio is a ratio of the number of antenna ports with a non-zero PUSCH transmission power corresponding to the precoding over the number of antenna ports that corresponds to the uplink transmission mode of the PUSCH of the terminal and is configured by the network device for the terminal.

It is assumed that the number of antenna ports corresponding to the PUSCH with a non-zero power corresponding to the other precoding is denoted as $Q_{used1}$, the number of antenna ports corresponding to the uplink transmission mode of the terminal PUSCH configured by the network device for the terminal is denoted as $Q_{configured1}$, the first ratio K1 is obtained $K1=Q_{used1}/Q_{configured1}$. For non-codebook-based uplink transmission, if the assumed coherent transmission capability of the terminal is non-coherent transmission, the network device determines the transmission power assumption corresponding to the other corresponding to the precoding of the first stream number other than the third target precoding is that the terminal scales the uplink transmission power determined by the power control procedure, according to the first ratio K1. When receiving the uplink precoding indication corresponding to the precoding of the first stream number except the third target precoding, the terminal scales the uplink transmission power determined according to the power control procedure according to the first ratio K1.

The first stream number may be a single stream or multiple streams, such as 2 streams, 3 streams, 4 streams, and so on.

According to some embodiments of the present disclosure, the uplink transmission mode is non-codebook-based uplink transmission, the assumed coherent transmission capability of the terminal is partial coherent transmission, and the above step 4012 further includes: determining a transmission power assumption corresponding to a precoding corresponding to a single-stream transmission except the third target precoding to be: that the terminal scales, according to a second ratio, the uplink transmission power determined according to the power control procedure, where the second ratio is a ratio of a maximum number of antenna ports capable of being transmitted coherently that is supported by the terminal over the number of antenna ports that is configured by the network device for the terminal and corresponds to an uplink transmission mode of the physical uplink shared channel (PUSCH) of the terminal.

It is assumed that the number of antenna ports corresponding to the PUSCH with a non-zero power corresponding to the other precoding is denoted as $Q_{used1}$, the number of antenna ports corresponding to the uplink transmission mode of the terminal PUSCH configured by the network device for the terminal is denoted as $Q_{configured1}$, the second ratio K2 is obtained $K2=Q_{max}/Q_{configured1}$. For non-codebook-based uplink transmission, if the assumed coherent transmission capability of the terminal is partial-coherent transmission, the network device determines the transmission power assumption corresponding to the precoding corresponding to a single-stream transmission except the third target precoding is that the terminal scales the uplink transmission power determined by the power control procedure, according to the second ratio K2. When receiving the uplink precoding indication corresponding to the second ratio K2, the terminal scales the uplink transmission power determined according to the power control procedure according to the second ratio K2.

In this case, for non-codebook-based uplink transmissions, if the assumed coherent transmission capability of the terminal is partial coherent transmission, the network device may determine a transmission power assumption corresponding to a precoding of a multi-stream (such as 2-stream, 3-stream or 4-stream) transmission except the target precoding indication to be that the terminal scales the uplink transmission power determined according to the power control procedure according to the first ratio K1.

Of course, for non-codebook-based uplink transmissions, if the assumed coherent transmission capability of the terminal is partial coherent transmission, the network device may also determine a transmission power assumption corresponding to a precoding of a multi-stream (such as 2-stream, 3-stream or 4-stream) transmission except the target precoding indication to be that the terminal scales the uplink transmission power determined according to the power control procedure according to the second ratio K2.

According to some embodiments of the present disclosure, the uplink transmission mode is non-codebook-based uplink transmission, and the above step 4012 includes: determining a transmission power assumption corresponding to a precoding corresponding to a single-stream transmission to be: that the terminal scales, according to a second ratio, the uplink transmission power determined according to the power control procedure, where the second ratio is a ratio between a maximum number of antenna ports capable of being transmitted coherently that is supported by the terminal and the number of antenna ports that is configured by the network device for the terminal and corresponds to an uplink transmission mode of the physical uplink shared channel (PUSCH) of the terminal.

It is assumed that the maximum number of antenna ports capable of being transmitted coherently that is supported by the terminal is denoted as $Q_{max}$, the number of antenna ports corresponding to the uplink transmission mode of the terminal PUSCH configured by the network device for the terminal is denoted as $Q_{configured1}$, and the second ratio K2 is $K2=Q_{max}/Q_{configured1}$. For non-codebook-based uplink transmission, the network device determines the transmission power assumption corresponding to a precoding corresponding to a single-stream transmission to be that the terminal scales, according to the second ratio K2, the uplink transmission power determined according to the power control procedure. When the terminal receives the uplink precoding indication corresponding to the precoding indication for single-stream transmission, the terminal scales the uplink transmission power determined according to the power control procedure according to the second ratio K2.

According to some embodiments of the present disclosure, the uplink transmission mode is non-codebook-based uplink transmission, the assumed coherent transmission capability of the terminal is full coherent transmission, and the above step 4012 includes: determining a transmission power assumption corresponding to any precoding to be that the terminal controls a value of an uplink transmission power determined according to a power control procedure to remain unchanged.

In this case, for non-codebook-based uplink transmission, if the assumed coherent transmission capability of the terminal is full coherent transmission, the network device determines that the transmission power assumption corresponding to any precoding to be that the terminal controls a value of an uplink transmission power determined according to a power control procedure to remain unchanged. Upon receipt of any precoding indication, the terminal controls the value of the uplink transmission power determined according to the power control procedure to remain unchanged.

According to some embodiments of the present disclosure, the method further includes: transmitting, to the terminal, indication information for indicating the first target precoding.

In this case, when the target precoding indication is notified by signaling, if the first target precoding exists in the uplink transmission mode, the network device transmits the indication information for indicating the first target precoding to the terminal, so that the terminal can obtain an indication of the first target precoding through the indication information. When the received uplink precoding indication corresponds to the first target precoding indication, the terminal controls the value of the uplink transmission power determined according to the power control procedure to remain unchanged, that is, scaling factors of normalization powers of all precoding are 1, or no scaling is performed.

According to some embodiments of the present disclosure, the method further includes: transmitting, to the terminal, indication information for indicating the second target precoding and/or the third target precoding.

In this case, when the target precoding indication is notified by signaling, if there is a second target precoding in the uplink transmission mode, the network device transmits indication information for indicating the second target precoding to the terminal, so that the terminal can obtain the second target precoding through the indication information. When the received uplink precoding indication corresponds to the second target precoding indication, the terminal controls the value of the uplink transmission power determined according to the power control procedure to remain unchanged. Similarly, when the target precoding indication is notified by signaling, if there is a third target precoding in the uplink transmission mode, the network device transmits indication information for indicating the third target precoding to the terminal, so that the terminal can obtain the third target precoding indication through the indication information. When the received uplink precoding indication corresponds to the third target precoding indication, the terminal controls the value of the uplink transmission power determined according to the power control procedure to remain unchanged.

Some possible implementation manners of the embodiments of the present disclosure are illustrated as follows:

Example 1: in a case that a transmission mode of a terminal is an uplink transmission mode based on a codebook, and a target precoding indication corresponds to a precoding indication whose TPMI value is index 0, and a target precoding is a precoding (codeword) with a corresponding TPMI value of index 0. The network device assumes that when a precoding indication transmitted to the terminal is the target precoding indication corresponding to the target precoding, the terminal does not scale the uplink transmission power determined by the power control procedure. The network device assumes that when a precoding indication transmitted to the terminal is not the target precoding indication corresponding to the target precoding, the terminal scales the uplink transmission power determined by the power control procedure, and a scaling ratio is a ratio of the number of antenna ports with a non-zero power corresponding to the codeword corresponding to the precoding indication, to the number of antenna ports configured by the network device for the terminal and corresponding to the transmission mode of the codebook-based uplink transmission mode. If a precoding indication received by the terminal is the target precoding indication, the terminal does not scale the uplink transmission power determined by the power control procedure; and if the precoding indication received by the terminal is not the target precoding indication, the terminal scales the uplink transmission power determined by the power control procedure, and the scaling ratio is a ratio of the number of antenna ports with a non-zero power corresponding to the codeword corresponding to the precoding indication, to the number of antenna ports configured by the network device for the terminal and corresponding to the transmission mode of the codebook-based uplink transmission mode.

Example 2: in a case that a transmission mode of a terminal is an uplink transmission mode not based on a codebook, and a target precoding indication corresponds to a precoding indication whose SRI index is 0 (SRI=0), and a target precoding is a precoding corresponding to an SRS source where SRI=0. The network device assumes that when a precoding indication transmitted to the terminal is the target precoding indication corresponding to the target precoding, the terminal does not scale the uplink transmission power determined by the power control procedure. The network device assumes that when a precoding indication transmitted to the terminal is not the target precoding indication corresponding to the target precoding, the terminal scales the uplink transmission power determined by the power control procedure, and a scaling ratio is a ratio of the number of antenna ports with a non-zero power corresponding to the codeword corresponding to the precoding indication, to the number of antenna ports configured by the network device for the terminal and corresponding to the transmission mode of the non-codebook-based uplink transmission mode. If a precoding indication received by the terminal is the target precoding indication, the terminal does not scale the uplink transmission power determined by the power control procedure; and if the precoding indication received by the terminal is not the target precoding indication, the terminal scales the uplink transmission power determined by the power control procedure, and the scaling ratio is a ratio of the number of antenna ports with a non-zero power corresponding to the codeword corresponding to the precoding indication, to the number of antenna ports configured by the network device for the terminal and corresponding to the transmission mode of the non-codebook-based uplink transmission mode.

Example 3: in a case that a transmission mode of a terminal is an uplink transmission mode not based on a codebook, the coherent transmission capability of the terminal is non-coherent transmission capability, and a target precoding indication corresponds to a precoding indication whose SRI index is 0 (SRI=0), a target precoding is a precoding corresponding to an SRS source where SRI=0. The network device assumes that when a precoding indication transmitted to the terminal is the target precoding indication corresponding to the target precoding, the terminal does not scale the uplink transmission power determined by the power control procedure. The network device assumes that when a precoding indication transmitted to the terminal is not the target precoding indication corresponding to the target precoding, the terminal scales the uplink transmission power determined by the power control procedure, and a scaling ratio is a ratio of the number of antenna ports with a non-zero power corresponding to the codeword corresponding to the precoding indication, to the number of antenna ports configured by the network device for the terminal and corresponding to the transmission mode of the non-codebook-based uplink transmission mode. If a precoding indication received by the terminal is the target precoding indication, the terminal does not scale the uplink transmission power determined by the power control procedure; and if the precoding indication received by the terminal is not the target precoding indication, the terminal scales the uplink transmission power determined by the power control procedure, and the scaling ratio is a ratio of the number of antenna ports with a non-zero power corresponding to the codeword corresponding to the precoding indication, to the number of antenna ports configured by the network device for the terminal and corresponding to the transmission mode of the non-codebook-based uplink transmission mode.

Example 4: in a case that a transmission mode of a terminal is an uplink transmission mode not based on a codebook, the coherent transmission capability of the terminal is partial-coherent transmission capability, and a target precoding indication corresponds to a precoding indication whose SRI index is 0 (SRI=0), a target precoding is a precoding corresponding to an SRS source where SRI=0. The network device assumes that when a precoding indication transmitted to the terminal is the target precoding indication corresponding to the target precoding, the terminal does not scale the uplink transmission power determined by the power control procedure. The network device assumes that when a precoding indication transmitted to the terminal is not the target precoding indication corresponding to the target precoding, the terminal scales the uplink transmission power determined by the power control procedure, and a scaling ratio is a ratio of the number of antenna ports with a non-zero power corresponding to the codeword corresponding to the precoding indication, to the number of antenna ports configured by the network device for the terminal and corresponding to the transmission mode of the non-codebook-based uplink transmission mode. If a precoding indication received by the terminal is the target precoding indication, the terminal does not scale the uplink transmission power determined by the power control procedure; and if the precoding indication received by the terminal is not the target precoding indication, the terminal scales the uplink transmission power determined by the power control procedure, and the scaling ratio is a ratio of the number of antenna ports with a non-zero power corresponding to the codeword corresponding to the precoding indication, to the number of antenna ports configured by the network device for the terminal and corresponding to the transmission mode of the non-codebook-based uplink transmission mode.

Example 5: in a case that a transmission mode of a terminal is a non-codebook-based uplink transmission mode, the coherent transmission capability of the terminal is partial-coherent transmission capability, and a target precoding indication corresponds to a precoding indication whose SRI index is 0 (SRI=0), a target precoding is a precoding corresponding to an SRS source where SRI=0. The network device assumes that when a precoding indication transmitted to the terminal is the target precoding indication corresponding to the target precoding, the terminal does not scale the uplink transmission power determined by the power control procedure. The network device assumes that when a precoding indication transmitted to the terminal is not the target precoding indication corresponding to the target precoding, the terminal scales the uplink transmission power determined by the power control procedure. If a precoding indication sent to the terminal corresponds to a single stream, the scaling ratio is a ratio of a maximum number of antenna ports capable of being transmitted coherently that is supported by the terminal (for example, according to the definition of coherent transmission capability in the 3GPP NR system, in the case of partial coherent transmission, the maximum number of antenna ports of a terminal where coherent transmission can be performed can be considered as 2), to the number of antenna ports configured by the network device for the terminal and corresponding to the transmission mode of the non-codebook-based uplink transmission mode; otherwise, the scaling ratio is a ratio of the number of antenna ports with a non-zero power corresponding to the codeword corresponding to the precoding indication, to the number of antenna ports configured by the network device for the terminal and corresponding to the transmission mode of the non-codebook-based uplink transmission mode. In a case that a precoding indication received by the terminal is the target precoding indication, the terminal does not scale the uplink transmission power determined by the power control procedure; and in a case that the precoding indication received by the terminal is not the target precoding indication, the terminal scales the uplink transmission power determined by the power control procedure. When the precoding indication transmitted to the terminal corresponds to a precoding of single-stream, the scaling ratio is a ratio of a maximum number of antenna ports capable of being transmitted coherently that is supported by the terminal (for example, according to the definition of coherent transmission capability in the 3GPP NR system, in the case of partial coherent transmission, the maximum number of antenna ports of a terminal where coherent transmission can be performed can be considered as 2), to the number of antenna ports configured by the network device for the terminal and corresponding to the transmission mode of the non-codebook-based uplink transmission mode; otherwise, the scaling ratio is a ratio of the number of antenna ports with a non-zero power corresponding to the codeword corresponding to the precoding indication, to the number of antenna ports configured by the network device for the terminal and corresponding to the transmission mode of the non-codebook-based uplink transmission mode.

Example 6: in a case that a transmission mode of a terminal is a non-codebook-based uplink transmission mode, the coherent transmission capability of the terminal is partial-coherent transmission capability, and a target precoding indication corresponds to a precoding indication whose SRI index is 0 (SRI=0), a target precoding is a precoding corresponding to an SRS source where SRI=0 (or the first SRS source). The network device assumes that when a precoding indication transmitted to the terminal is the target precoding indication corresponding to the target precoding, the terminal does not scale the uplink transmission power determined by the power control procedure. The network device assumes that when a precoding indication transmitted to the terminal is not the target precoding indication corresponding to the target precoding, the terminal scales the uplink transmission power determined by the power control procedure, where the scaling ratio is a ratio of a maximum number of antenna ports capable of being transmitted coherently that is supported by the terminal (for example, according to the definition of coherent transmission capability in the 3GPP NR system, in the case of partial coherent transmission, the maximum number of antenna ports of a terminal where coherent transmission can be performed can be considered as 2), to the number of antenna ports configured by the network device for the terminal and corresponding to the transmission mode of the non-codebook-based uplink transmission mode. In a case that a precoding indication received by the terminal is the target precoding indication, the terminal does not scale the uplink transmission power determined by the power control procedure; and in a case that a precoding indication received by the terminal is not the target precoding indication, the terminal scales the uplink transmission power determined by the power control procedure. When the precoding indication transmitted to the terminal corresponds to a precoding of single-stream, the scaling ratio is a ratio of a maximum number of antenna ports capable of being transmitted coherently that is supported by the terminal (for example, according to the definition of coherent transmission capability in the 3GPP NR system, in the case of partial coherent transmission, the maximum number of antenna ports of a terminal where coherent transmission can be performed can be considered as 2), to the number of antenna ports configured by the network device for the terminal and corresponding to the transmission mode of the non-codebook-based uplink transmission mode.

Example 7: in a case that a transmission mode of a terminal is a non-codebook-based uplink transmission mode, the coherent transmission capability of the terminal is partial-coherent transmission capability, a target precoding does not exist and a target precoding indication does also not exist, the network device assumes that the terminal scales the uplink transmission power determined by the power control procedure. The scaling ratio is a ratio of a maximum number of antenna ports capable of being transmitted coherently that is supported by the terminal (for example, according to the definition of coherent transmission capability in the 3GPP NR system, in the case of partial coherent transmission, the maximum number of antenna ports of a terminal where coherent transmission can be performed can be considered as 2), to the number of antenna ports configured by the network device for the terminal and corresponding to the transmission mode of the non-codebook-based uplink transmission mode. No matter what kind of precoding indication the terminal receives, the terminal scales the uplink transmission power determined by the power control procedure, and the scaling ratio is a ratio of a maximum number of antenna ports capable of being transmitted coherently that is supported by the terminal (for example, according to the definition of coherent transmission capability in the 3GPP NR system, in the case of partial coherent transmission, the maximum number of antenna ports of a terminal where coherent transmission can be performed can be considered as 2), to the number of antenna ports configured by the network device for the terminal and corresponding to the transmission mode of the non-codebook-based uplink transmission mode.

Example 8: in a case that the transmission mode of the terminal is a non-codebook-based uplink transmission mode, the coherent transmission capability of the terminal is full coherent transmission, there is no target precoding and no target precoding indication, the network device assumes that the terminal does not scale the uplink transmission power determined in the power control procedure. No matter what kind of precoding indication the terminal receives, the terminal does not scale the uplink transmission power determined by the power control procedure.

In the uplink power control method according to the embodiments of the present disclosure, the network device determines the transmission power assumption used to determine the uplink precoding indication of the terminal, and transmits the uplink precoding indication to the terminal, so that the terminal controls the value of the uplink transmission power determined according to the power control procedure to remain unchanged, when receiving the uplink precoding indication corresponds to the target precoding indication, which ensures that a maximum transmission power can be reached under partial precoding indications, thereby improving the performance. For example, when the terminal performs uplink MIMO transmissions at a low rank and not based on a codebook, an uplink transmission corresponding to the target precoding indication can reach a maximum uplink transmission power; when a terminal with non-coherent transmission capability or partial coherent transmission capability performs uplink MIMO transmissions based on a codebook, an uplink transmission corresponding to the target precoding indication can reach a maximum uplink transmission power; and it is not required that all antennas of the terminal can reach the maximum transmission power, thereby reducing the cost.

Figure 5:
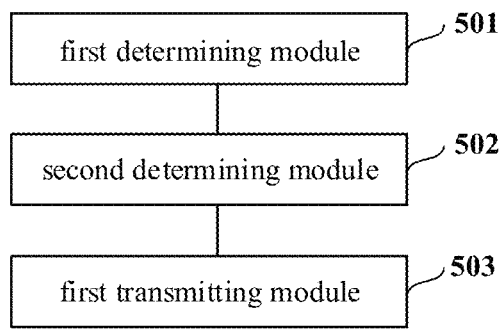
FIG. 5 is a schematic structural diagram of a network device provided by an embodiment of the disclosure.

Based on the uplink power control method provided in the above embodiments, embodiments of the present disclosure further provide a network device. Referring to FIG. 5, the network device includes:

a first determining module 501 configured to determine a transmission power assumption for determining an uplink precoding indication of a terminal;

a second determining module 502 configured to determine the uplink precoding indication of the terminal according to the transmission power assumption; and a first transmitting module 503 configured to transmit the uplink precoding indication to the terminal.

The network device according to the embodiments of the present disclosure determines the transmission power assumption for determining the uplink precoding indication of the terminal, and transmits the uplink precoding indication to the terminal, so that the terminal controls the value of the uplink transmission power determined according to the power control procedure to remain unchanged, when receiving the uplink precoding indication corresponds to the target precoding indication, which ensures that a maximum transmission power can be reached under partial precoding indications, thereby improving the performance. For example, when the terminal performs uplink MIMO transmissions at a low rank and not based on a codebook, an uplink transmission corresponding to the target precoding indication can reach a maximum uplink transmission power; when a terminal with non-coherent transmission capability or partial coherent transmission capability performs uplink MIMO transmissions based on a codebook, an uplink transmission corresponding to the target precoding indication can reach a maximum uplink transmission power; and it is not required that all antennas of the terminal can reach the maximum transmission power, thereby reducing the cost.

According to some embodiments of the present disclosure, the first determining module 501 includes:

a first determining submodule configured to determine an assumed coherent transmission capability of the terminal and an uplink transmission mode; and a second determining submodule configured to determine, according to the assumed coherent transmission capability of the terminal and/or the uplink transmission mode, the transmission power assumption for determining the uplink precoding indication of the terminal.

According to some embodiments of the present disclosure, the assumed coherent transmission capability of the terminal is a coherent transmission capability of the terminal obtained according to a terminal coherent transmission capability report; or the assumed coherent transmission capability of the terminal is a coherent transmission capability corresponding to a codebook subset restriction configured for the terminal.

According to some embodiments of the present disclosure, different uplink transmission modes correspond to different assumed coherent transmission capabilities of the terminal.

According to some embodiments of the present disclosure, the second determining submodule includes: a first determining unit configured to, in a case that a first target precoding exists in the uplink transmission mode, determine a transmission power assumption corresponding to the first target precoding to be that the terminal controls a value of an uplink transmission power determined according to a power control procedure to remain unchanged.

According to some embodiments of the present disclosure, the second determining submodule further includes: a second determining unit configured to determine a transmission power assumption corresponding to a precoding other than the first target precoding to be: that the terminal scales the uplink transmission power determined according to the power control procedure, according to the number of antenna ports configured by a network device for the terminal or the number of uplink sounding reference signal (SRS) resources configured by a network device for the terminal.

According to some embodiments of the present disclosure, the second determining submodule includes: a third determining unit configured to determine a transmission power assumption corresponding to a second target precoding in the uplink transmission mode to be that the terminal controls a value of an uplink transmission power determined according to a power control procedure to remain unchanged, in a case that the assumed coherent transmission capability of the terminal is non-coherent transmission; and/or, a fourth determining unit configured to determine a transmission power assumption corresponding to a third target precoding in the uplink transmission mode to be that the terminal controls a value of an uplink transmission power determined according to a power control procedure to remain unchanged, in a case that the assumed coherent transmission capability of the terminal is partial coherent transmission.

According to some embodiments of the present disclosure, the uplink transmission mode is non-codebook-based uplink transmission, the assumed coherent transmission capability of the terminal is non-coherent transmission, and the second determining submodule further includes: a fifth determining unit configured to determine a transmission power assumption corresponding to another precoding than the second target precoding to be: that the terminal scales, according to a first ratio, the uplink transmission power determined according to the power control procedure, where the first ratio is a ratio of the number of antenna ports with a non-zero PUSCH transmission power corresponding to the other precoding over the number of antenna ports that corresponds to the uplink transmission mode of the PUSCH of the terminal and is configured by the network device for the terminal.

According to some embodiments of the present disclosure, the uplink transmission mode is non-codebook-based uplink transmission, the assumed coherent transmission capability of the assumed terminal is partial coherent transmission, and the second determining submodule further includes: a sixth determining unit configured to determine a transmission power assumption corresponding to a precoding of a first stream number other than the third target precoding to be: that the terminal scales, according to a first ratio, the uplink transmission power determined according to the power control procedure, where the first ratio is a ratio of the number of antenna ports with a non-zero PUSCH transmission power corresponding to the precoding over the number of antenna ports that corresponds to the uplink transmission mode of the PUSCH of the terminal and is configured by the network device for the terminal.

According to some embodiments of the present disclosure, the uplink transmission mode is non-codebook-based uplink transmission, the assumed coherent transmission capability of the assumed terminal is partial coherent transmission, and the second determining submodule further includes: a seventh determining unit configured to determine a transmission power assumption corresponding to a precoding corresponding to a single-stream transmission except the third target precoding to be: that the terminal scales, according to a second ratio, the uplink transmission power determined according to the power control procedure, where the second ratio is a ratio between a maximum number of antenna ports capable of being transmitted coherently that is supported by the terminal and the number of antenna ports that is configured by the network device for the terminal and corresponds to an uplink transmission mode of the physical uplink shared channel (PUSCH) of the terminal.

According to some embodiments of the present disclosure, the uplink transmission mode is non-codebook-based uplink transmission, the assumed coherent transmission capability of the assumed terminal is partial coherent transmission, and the second determining submodule includes: an eighth determining unit configured to determine a transmission power assumption corresponding to a precoding corresponding to a single-stream transmission to be: that the terminal scales, according to a second ratio, the uplink transmission power determined according to the power control procedure, where the second ratio is a ratio of a maximum number of antenna ports capable of being transmitted coherently that is supported by the terminal to the number of antenna ports that is configured by the network device for the terminal and corresponds to an uplink transmission mode of the physical uplink shared channel (PUSCH) of the terminal.

According to some embodiments of the present disclosure, the uplink transmission mode is non-codebook-based uplink transmission, the assumed coherent transmission capability of the terminal is full coherent transmission, and the second determining submodule includes: a ninth determining unit configured to determine a transmission power assumption corresponding to any precoding to be that the terminal controls a value of an uplink transmission power determined according to a power control procedure to remain unchanged.

According to some embodiments of the present disclosure, the method further includes: a second transmitting module configured to transmit, to the terminal, indication information for indicating the first target precoding.

According to some embodiments of the present disclosure, it further includes: a third transmitting module configured to transmit, to the terminal, indication information for indicating the second target precoding and/or the third target precoding.

The network device according to the embodiments of the present disclosure determines the transmission power assumption used to determine the uplink precoding indication of the terminal, and transmits the uplink precoding indication to the terminal, so that the terminal controls the value of the uplink transmission power determined according to the power control procedure to remain unchanged, when receiving the uplink precoding indication corresponds to the target precoding indication, which ensures that a maximum transmission power can be reached under partial precoding indications, thereby improving the performance. For example, when the terminal performs uplink MIMO transmissions at a low rank and not based on a codebook, an uplink transmission corresponding to the target precoding indication can reach a maximum uplink transmission power; when a terminal with non-coherent transmission capability or partial coherent transmission capability performs uplink MIMO transmissions based on a codebook, an uplink transmission corresponding to the target precoding indication can reach a maximum uplink transmission power; and it is not required that all antennas of the terminal can reach the maximum transmission power, thereby reducing the cost.

It should be noted that all the implementation manners in the foregoing embodiments about the uplink power control method are applicable to embodiments of the network device, and the same technical effect can also be achieved.

Figure 6:
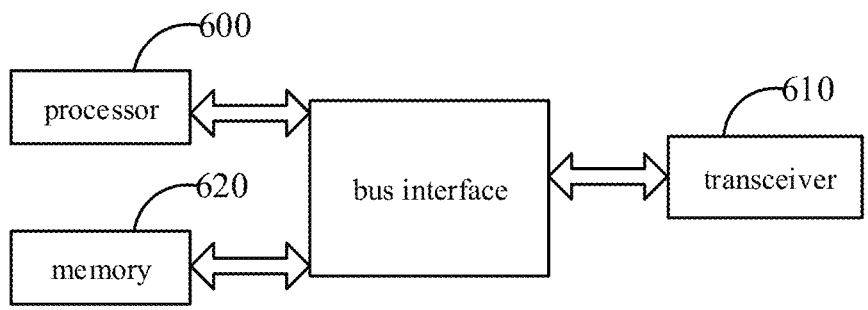
FIG. 6 is another schematic structural diagram of a network device provided by an embodiment of the disclosure.

In some embodiments of the present disclosure, as shown in FIG. 6, a network device is further provided, which includes a transceiver 610, a memory 620, a processor 600, a bus interface, and a computer program stored on the memory 620 and executable on the processor 600. The processor 600 is configured to read a program in a memory, and execute the following process: determining a transmission power assumption for determining an uplink precoding indication of a terminal; and determining the uplink precoding indication of the terminal according to the transmission power assumption. The transceiver 610 is configured to transmit the uplink precoding indication to the terminal.

The network device according to the embodiments of the present disclosure determines the transmission power assumption used to determine the uplink precoding indication of the terminal, and transmits the uplink precoding indication to the terminal, so that the terminal controls the value of the uplink transmission power determined according to the power control procedure to remain unchanged, when receiving the uplink precoding indication corresponds to the target precoding indication, which ensures that a maximum transmission power can be reached under part of precoding indications, thereby improving the performance. For example, when the terminal performs uplink MIMO transmissions at a low rank and not based on a codebook, an uplink transmission corresponding to the target precoding indication can reach a maximum uplink transmission power; when a terminal with non-coherent transmission capability or partial coherent transmission capability performs uplink MIMO transmissions based on a codebook, an uplink transmission corresponding to the target precoding indication can reach a maximum uplink transmission power; and it is not required that all antennas of the terminal can reach the maximum transmission power, thereby reducing the cost.

In FIG. 6, the bus architecture may include any number of interconnected buses and bridges. Specifically, various circuits including one or more processors represented by the processor 600 and a memory represented by the memory 620 are linked together. The bus architecture can also link various other circuits such as peripheral devices, voltage regulators, power management circuits, etc., which are all known in the art, and therefore, no further descriptions are provided herein. The bus interface provides an interface. The transceiver 610 may be a plurality of elements, that is, including a transmitter and a receiver, and to provide a unit for communicating with various other devices on a transmission medium. The processor 600 is responsible for managing the bus architecture and general processing, and the memory 620 can store data used by the processor 600 when performing operations.

According to some embodiments of the present disclosure, the processor 600 is further configured to: determine an assumed coherent transmission capability of the terminal and an uplink transmission mode; and determine, according to the assumed coherent transmission capability of the terminal and/or the uplink transmission mode, the transmission power assumption for determining the uplink precoding indication of the terminal.

According to some embodiments of the present disclosure, the assumed coherent transmission capability of the terminal is a coherent transmission capability of the terminal obtained according to a terminal coherent transmission capability report; or the assumed coherent transmission capability of the terminal is a coherent transmission capability corresponding to a codebook subset restriction configured for the terminal.

According to some embodiments of the present disclosure, the processor 600 is further configured to: in a case that a first target precoding exists in the uplink transmission mode, determine a transmission power assumption corresponding to the first target precoding to be that the terminal controls a value of an uplink transmission power determined according to a power control procedure to remain unchanged.

According to some embodiments of the present disclosure, the processor 600 is further configured to: determine a transmission power assumption corresponding to a precoding other than the first target precoding to be: that the terminal scales the uplink transmission power determined according to the power control procedure, according to the number of antenna ports configured by a network device for the terminal or the number of uplink sounding reference signal (SRS) resources configured by a network device for the terminal.

According to some embodiments of the present disclosure, the processor 600 is further configured to: determine a transmission power assumption corresponding to a second target precoding in the uplink transmission mode to be that the terminal controls a value of an uplink transmission power determined according to a power control procedure to remain unchanged, in a case that the assumed coherent transmission capability of the terminal is non-coherent transmission; and/or, determine a transmission power assumption corresponding to a third target precoding in the uplink transmission mode to be that the terminal controls a value of an uplink transmission power determined according to a power control procedure to remain unchanged, in a case that the assumed coherent transmission capability of the terminal is partial coherent transmission.

According to some embodiments of the present disclosure, the uplink transmission mode is non-codebook-based uplink transmission, the assumed coherent transmission capability of the terminal is non-coherent transmission, and the processor 600 is further configured to: determine a transmission power assumption corresponding to another precoding than the second target precoding to be: that the terminal scales, according to a first ratio, the uplink transmission power determined according to the power control procedure, where the first ratio is a ratio of the number of antenna ports with a non-zero PUSCH transmission power corresponding to the other precoding over the number of antenna ports that corresponds to the uplink transmission mode of the PUSCH of the terminal and is configured by the network device for the terminal.

According to some embodiments of the present disclosure, the uplink transmission mode is non-codebook-based uplink transmission, the assumed coherent transmission capability of the assumed terminal is partial coherent transmission, and the processor 600 is further configured to: determine a transmission power assumption corresponding to a precoding of a first stream number other than the third target precoding to be: that the terminal scales, according to a first ratio, the uplink transmission power determined according to the power control procedure, where the first ratio is a ratio of the number of antenna ports with a non-zero PUSCH transmission power corresponding to the precoding over the number of antenna ports that corresponds to the uplink transmission mode of the PUSCH of the terminal and is configured by the network device for the terminal.

According to some embodiments of the present disclosure, the uplink transmission mode is non-codebook-based uplink transmission, the assumed coherent transmission capability of the assumed terminal is partial coherent transmission, and the processor 600 is further configured to: determine a transmission power assumption corresponding to a precoding corresponding to a single-stream transmission except the third target precoding to be: that the terminal scales, according to a second ratio, the uplink transmission power determined according to the power control procedure, where the second ratio is a ratio of a maximum number of antenna ports capable of being transmitted coherently that is supported by the terminal to the number of antenna ports that is configured by the network device for the terminal and corresponds to an uplink transmission mode of the physical uplink shared channel (PUSCH) of the terminal.

According to some embodiments of the present disclosure, the uplink transmission mode is non-codebook-based uplink transmission, the assumed coherent transmission capability of the assumed terminal is partial coherent transmission, and the processor 600 is further configured to: determine a transmission power assumption corresponding to a precoding corresponding to a single-stream transmission to be: that the terminal scales, according to a second ratio, the uplink transmission power determined according to the power control procedure, where the second ratio is a ratio of a maximum number of antenna ports capable of being transmitted coherently that is supported by the terminal to the number of antenna ports that is configured by the network device for the terminal and corresponds to an uplink transmission mode of the physical uplink shared channel (PUSCH) of the terminal.

According to some embodiments of the present disclosure, the uplink transmission mode is non-codebook-based uplink transmission, the assumed coherent transmission capability of the terminal is full coherent transmission, and the processor 600 is further configured to: determine a transmission power assumption corresponding to any precoding to be that the terminal controls a value of an uplink transmission power determined according to a power control procedure to remain unchanged.

According to some embodiments of the present disclosure, the transceiver 610 is further configured to transmit, to the terminal, indication information for indicating the first target precoding.

According to some embodiments of the present disclosure, the transceiver 610 is further configured to transmit, to the terminal, indication information for indicating the second target precoding and/or the third target precoding.

In some embodiments of the present disclosure, a computer-readable storage medium is provided, on which a computer program is stored. The program is executed by a processor to implement steps of the above-mentioned uplink power control method on the network device side.

In various embodiments of the present disclosure, it should be understood that the size of sequence numbers of the above processes does not mean an execution order. The execution order of the processes should be determined by their functions and internal logics, and should not constitute any limitation to implementation processes of the embodiments in the present disclosure.

It should be understood that the uplink transmission in the present invention is an uplink transmission of a specific signal, for example, a transmission of a PUSCH signal, a transmission of a PUCCH signal, and so on. Correspondingly, in the case of PUSCH transmission, the "uplink transmission power determined according to the power control procedure" is an uplink transmission power of PUSCH determined according to a power control procedure of the PUSCH.

The above embodiments are preferred embodiments of the present disclosure. It should be noted that several improvements and modifications can be made by those of ordinary skill in the art without departing from the principles described in the present disclosure. These improvements and modifications shall also fall within the protection scope of the present disclosure.

What is claimed is:

1. An uplink power control method, applied to a terminal, comprising:
   obtaining an uplink precoding indication; and
   controlling a value of an uplink transmission power determined according to a power control procedure to remain unchanged, in a case that the uplink precoding indication corresponds to a target precoding indication.

2. The method according to claim 1, wherein the controlling the value of the uplink transmission power determined according to the power control procedure to remain unchanged comprises:
   not scaling the uplink transmission power determined according to the power control procedure; or
   scaling, by a power scaling factor of 1, the uplink transmission power determined according to the power control procedure.

3. The method according to claim 1, wherein after obtaining the uplink precoding indication, the method further comprises:
   in a case that the uplink precoding indication corresponds to a precoding indication other than the target precoding indication, scaling the uplink transmission power determined according to the power control procedure, according to the number of antenna ports configured by a network device for the terminal or the number of uplink sounding reference signal (SRS) resources configured by a network device for the terminal.

4. The method according to claim 3, wherein the scaling the uplink transmission power determined according to the power control procedure, according to the number of antenna ports configured by the network device for the terminal comprises:
   obtaining a first ratio according to the precoding indication and the number of antenna ports that corresponds to an uplink transmission mode of a physical uplink shared channel (PUSCH) and is configured by a network for the terminal, wherein the first ratio is a ratio of the number of antenna ports with a non-zero PUSCH transmission power over the number of antenna ports that corresponds to the uplink transmission mode of the PUSCH of the terminal and is configured by the network device for the terminal; and
   scaling, according to the first ratio, the uplink transmission power determined according to the power control procedure, or
   wherein the scaling the uplink transmission power determined according to the power control procedure, according to the number of antenna ports configured by the network device for the terminal comprises:
   obtaining a second ratio of a maximum number of antenna ports capable of being transmitted coherently capable of being transmitted coherently that is supported by the terminal that is supported by the terminal to the number of antenna ports that corresponds to an uplink transmission mode of a PUSCH of the terminal and is configured by the network device for the terminal; and
   scaling, according to the second ratio, the uplink transmission power determined according to the power control procedure, or
   wherein the scaling the uplink transmission power determined according to the power control procedure, according to the number of uplink sounding reference signal (SRS) resources configured by the network device for the terminal comprises:
   obtaining a third ratio of the number of SRS resources indicated by an SRS resource indication (SRI) to the number of SRS resources that is configured by the network device for the terminal and corresponds to an uplink transmission mode of the physical uplink shared channel (PUSCH) of the terminal; and
   scaling, according to the third ratio, the uplink transmission power determined according to the power control procedure.

5. The method according to claim 1, wherein after obtaining the uplink precoding indication, the method further comprises:
   in a case that the uplink precoding indication corresponds to a transmission with a first number of streams and corresponds to a precoding indication other than the target precoding indication, scaling the uplink transmission power determined according to the power control procedure, according to the number of antenna ports configured by a network device for the terminal or the number of uplink sounding reference signal (SRS) resources configured by a network device for the terminal.

6. The method according to claim 1, wherein the target precoding indication comprises a transmission precoding matrix indicator (TPMI) corresponding to a target codeword and/or a transmission rank indication (TRI) corresponding to the target codeword, and the target codeword is a precoding matrix.

7. The method according to claim 1, wherein the target precoding indication comprises an SRS resource indication (SRI) for indicating a target SRS resource.

8. The method according to claim 7, wherein the target SRS resource comprises an SRS resource with a smallest index; and/or
   wherein the target precoding indication comprises a precoding indication for a single stream transmission.

9. The method according to claim 1, wherein the target precoding indication is a pre-defined precoding indication; or
   the target precoding indication is obtained according to indication information of the target precoding indication transmitted by a network device, and the method further comprises: receiving the indication information of the target precoding indication transmitted by the network device, and obtaining the target precoding indication according to the indication information; and/or wherein the method further comprises: determining a mapping relationship between a physical antenna and an antenna port according to the target precoding indication; and transmitting an uplink reference signal according to the mapping relationship.

10. The method according to claim 1, further comprising:
receiving codebook subset restriction information transmitted by a network device; and
determining, according to the codebook subset restriction information, whether the uplink precoding indication corresponds to the target precoding indication.

11. A terminal comprising a transceiver, a memory, a processor, and a computer program stored on the memory and executable on the processor;
wherein the transceiver is configured to obtain an uplink precoding indication; and
the processor is configured to read the program in the memory and execute a following process: controlling a value of an uplink transmission power determined according to a power control procedure to remain unchanged, in a case that the uplink precoding indication corresponds to a target precoding indication.

12. An uplink power control method, applied to a network device, comprising:
determining a transmission power assumption for determining an uplink precoding indication of a terminal;
determining the uplink precoding indication of the terminal according to the transmission power assumption; and
transmitting the uplink precoding indication to the terminal;
wherein the determining the transmission power assumption for determining the uplink precoding indication of the terminal comprises:
determining an assumed coherent transmission capability of the terminal and an uplink transmission mode; and
determining, according to the assumed coherent transmission capability of the terminal and/or the uplink transmission mode, the transmission power assumption for determining the uplink precoding indication of the terminal;
wherein the determining, according to the assumed coherent transmission capability of the terminal and/or the uplink transmission mode, the transmission power assumption for determining the uplink precoding indication of the terminal comprises:
in a case that a first target precoding exists in the uplink transmission mode, determining a transmission power assumption corresponding to the first target precoding to be that the terminal controls a value of an uplink transmission power determined according to a power control procedure to remain unchanged.

13. The method according to claim 12, wherein the assumed coherent transmission capability of the terminal is a coherent transmission capability of the terminal obtained according to a terminal coherent transmission capability report; or
the assumed coherent transmission capability of the terminal is a coherent transmission capability corresponding to a codebook subset restriction configured for the terminal.

14. The method according to claim 12, wherein the determining, according to the assumed coherent transmission capability of the terminal and/or the uplink transmission mode, the transmission power assumption for determining the uplink precoding indication of the terminal further comprises:
determining a transmission power assumption corresponding to a precoding other than the first target precoding to be: that the terminal scales the uplink transmission power determined according to the power control procedure, according to the number of antenna ports configured by a network device for the terminal or the number of uplink sounding reference signal (SRS) resources configured by a network device for the terminal.

15. The method according to claim 12, wherein the determining, according to the assumed coherent transmission capability of the terminal and/or the uplink transmission mode, the transmission power assumption for determining the uplink precoding indication of the terminal comprises:
determining a transmission power assumption corresponding to a second target precoding in the uplink transmission mode to be that the terminal controls a value of an uplink transmission power determined according to a power control procedure to remain unchanged, in a case that the assumed coherent transmission capability of the terminal is non-coherent transmission; and/or,
determining a transmission power assumption corresponding to a third target precoding in the uplink transmission mode to be that the terminal controls a value of an uplink transmission power determined according to a power control procedure to remain unchanged, in a case that the assumed coherent transmission capability of the terminal is partial coherent transmission.

16. The method according to claim 15, wherein the uplink transmission mode is non-codebook based uplink transmission, the assumed coherent transmission capability of the terminal is non-coherent transmission, and the determining, according to the assumed coherent transmission capability of the terminal and/or the uplink transmission mode, the transmission power assumption for determining the uplink precoding indication of the terminal further comprises:
determining a transmission power assumption corresponding to other precoding than the second target precoding to be: that the terminal scales, according to a first ratio, the uplink transmission power determined according to the power control procedure, wherein the first ratio is a ratio of the number of antenna ports with a non-zero PUSCH transmission power corresponding to the other precoding over the number of antenna ports that corresponds to the uplink transmission mode of the PUSCH of the terminal and is configured by the network device for the terminal; or
wherein the uplink transmission mode is non-codebook-based uplink transmission, the assumed coherent transmission capability of the assumed terminal is partial coherent transmission, and the determining, according to the assumed coherent transmission capability of the terminal and/or the uplink transmission mode, the transmission power assumption for determining the uplink precoding indication of the terminal further comprises:
determining a transmission power assumption corresponding to a precoding of a first stream number other than the third target precoding to be: that the terminal scales, according to a first ratio, the uplink transmission power determined according to the power control procedure, wherein the first ratio is a ratio of the number of antenna ports with a non-zero PUSCH transmission power corresponding to the precoding over the number of antenna ports that corresponds to the uplink transmission mode of the PUSCH of the terminal and is configured by the network device for the terminal; or wherein the uplink transmission mode is non-codebook-based uplink transmission, the assumed coherent transmission capability of the assumed terminal is partial coherent transmission, and the determining, according to the assumed coherent transmission capability of the terminal and/or the uplink transmission mode, the transmission power assumption for determining the uplink precoding indication of the terminal further comprises:

determining a transmission power assumption corresponding to a precoding corresponding to a single-stream transmission except the third target precoding to be: that the terminal scales, according to a second ratio, the uplink transmission power determined according to the power control procedure, wherein the second ratio is a ratio of a maximum number of antenna ports capable of being transmitted coherently that is supported by the terminal, to the number of antenna ports that is configured by the network device for the terminal and corresponds to an uplink transmission mode of the physical uplink shared channel (PUSCH) of the terminal.

17. The method according to claim 12, wherein the uplink transmission mode is non-codebook-based uplink transmission, the assumed coherent transmission capability of the assumed terminal is partial coherent transmission, and the determining, according to the assumed coherent transmission capability of the terminal and/or the uplink transmission mode, the transmission power assumption for determining the uplink precoding indication of the terminal further comprises:

determining a transmission power assumption corresponding to a precoding corresponding to a single-stream transmission to be: that the terminal scales, according to a second ratio, the uplink transmission power determined according to the power control procedure, wherein the second ratio is a ratio of a maximum number of antenna ports capable of being transmitted coherently that is supported by the terminal, to the number of antenna ports that is configured by the network device for the terminal and corresponds to an uplink transmission mode of the physical uplink shared channel (PUSCH) of the terminal; or wherein the uplink transmission mode is non-codebook-based uplink transmission, the assumed coherent transmission capability of the terminal is full coherent transmission, and the determining, according to the assumed coherent transmission capability of the terminal and/or the uplink transmission mode, the transmission power assumption for determining the uplink precoding indication of the terminal further comprises:

determining a transmission power assumption corresponding to any precoding to be that the terminal controls a value of an uplink transmission power determined according to a power control procedure to remain unchanged.

18. A network device comprising a transceiver, a memory, a processor, and a computer program stored on the memory and executable on the processor; wherein the processor is configured to read the program in the memory to perform steps of the uplink power control method according to claim 12.

* * * * *